(12) United States Patent
Mori

(10) Patent No.: US 8,754,970 B2
(45) Date of Patent: Jun. 17, 2014

(54) SOLID-STATE IMAGE CAPTURE DEVICE AND CONTROL METHOD AND CONTROL PROGRAM THEREFOR

(71) Applicant: Sony Corporation, Tokyo (JP)

(72) Inventor: Tomonori Mori, Fukuoka (JP)

(73) Assignee: Sony Corporation, Tokyo (JP)

( * ) Notice: Subject to any disclaimer, the term of this patent is extended or adjusted under 35 U.S.C. 154(b) by 59 days.

(21) Appl. No.: 13/659,578

(22) Filed: Oct. 24, 2012

(65) Prior Publication Data

US 2013/0107331 A1 May 2, 2013

(30) Foreign Application Priority Data

Oct. 31, 2011 (JP) ................. 2011-238792

(51) Int. Cl.
*H04N 3/14* (2006.01)
*H04M 1/00* (2006.01)
*H04M 1/66* (2006.01)

(52) U.S. Cl.
USPC ............................ 348/294; 341/126; 341/144

(58) Field of Classification Search
CPC ....... H04N 5/335; H04N 5/378; H04N 3/155; H04N 9/045; H01L 27/14643; H04M 1/00; H04M 2201/4135; H04M 2201/4233; H04M 2201/4262; H04M 2201/02
USPC .................. 348/294–308; 341/126
See application file for complete search history.

(56) References Cited

U.S. PATENT DOCUMENTS 8,023,022 B2 * 9/2011 Tsukimura .................... 348/300
8,174,598 B2 * 5/2012 Ebihara .......................... 348/296
8,610,795 B2 * 12/2013 Kondo ...................... 348/231.99

FOREIGN PATENT DOCUMENTS

JP 2007-195033 A 8/2007
JP 2008-067344 A 3/2008

* cited by examiner

*Primary Examiner* — Tuan Ho
*Assistant Examiner* — Selam Gebriel
(74) *Attorney, Agent, or Firm* — Rader, Fishman & Grauer PLLC

(57) ABSTRACT

A solid-state image capture device including: a pixel having a photoelectric conversion element and first to fourth switch elements; a reference-signal generator that generates a reference signal; and an analog-to-digital converter that generates a digital signal corresponding to an analog signal output by the pixel, by using a comparator having first and second input terminals. The second switch element is turned on to reset a voltage of the predetermined connection point, the fourth switch element is turned on while a connection degree of the second switch element is in an intermediate state between an on state and an off state to cause the first and second input terminals to reach a same potential, and the second switch element is not turned on and at least one of the first and third switch elements is turned on to cause the analog-to-digital converter to perform conversion into a digital signal.

5 Claims, 23 Drawing Sheets

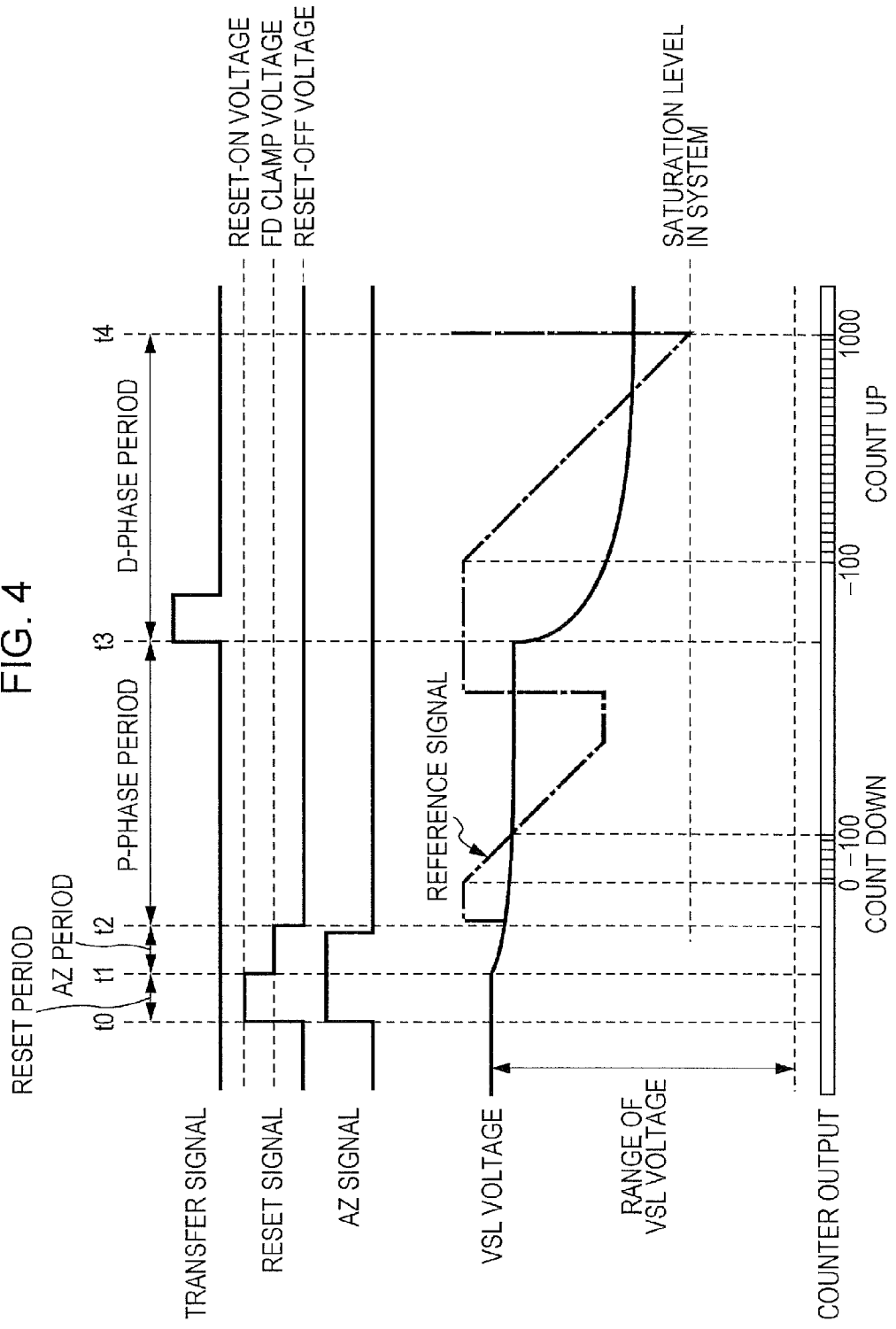

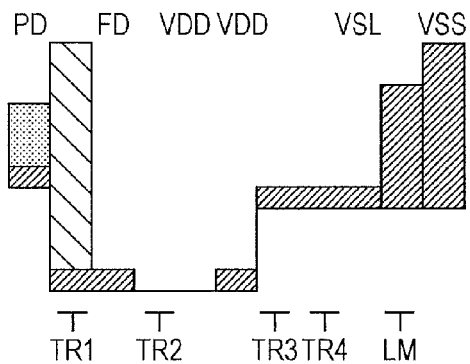
FIG. 5A
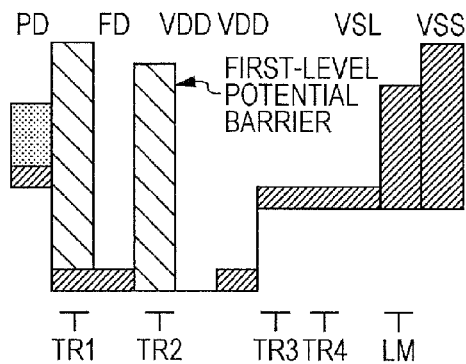
FIG. 5C
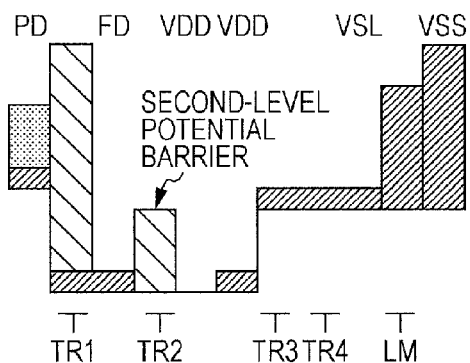
FIG. 5B
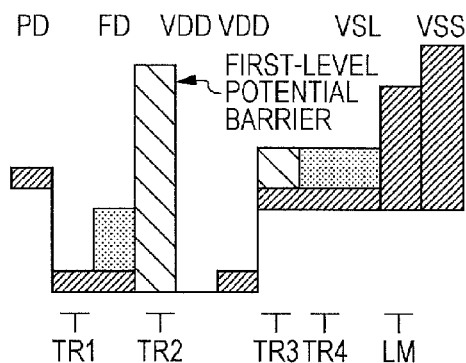
FIG. 5D
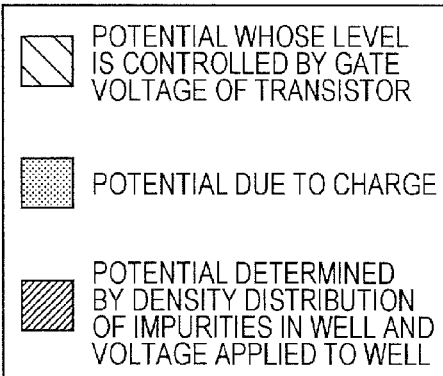

FIG. 7A
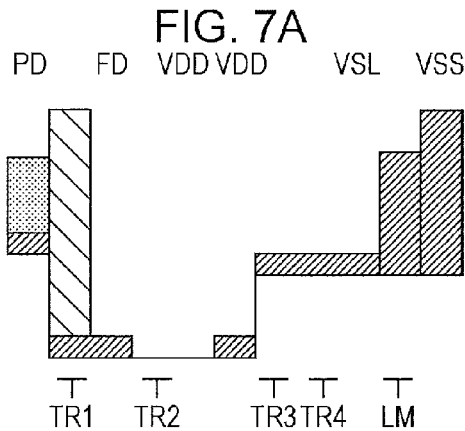
FIG. 7B
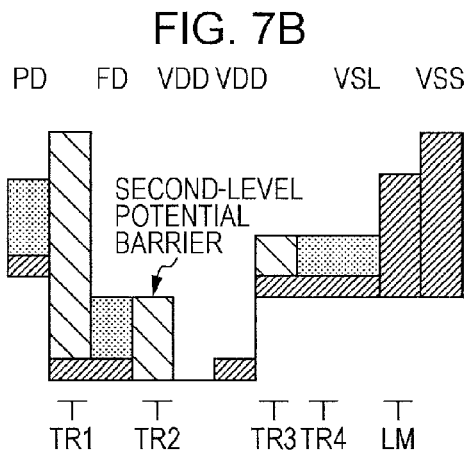
FIG. 7C
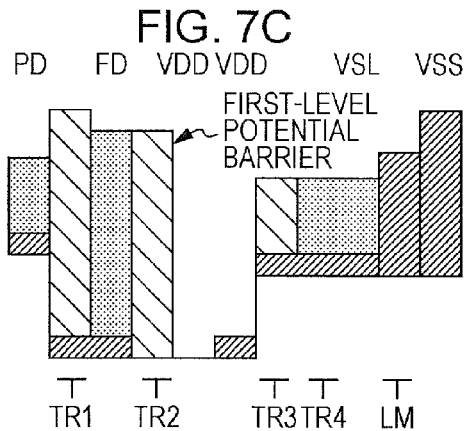
FIG. 7D
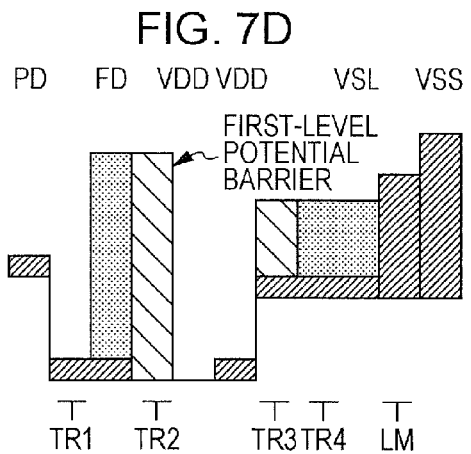
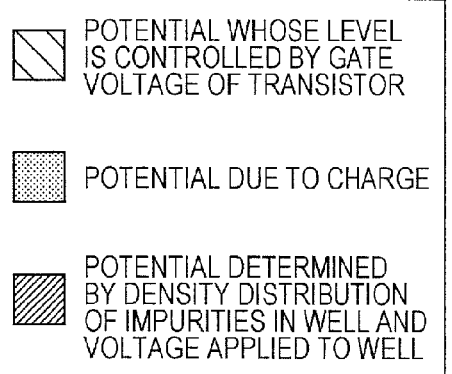

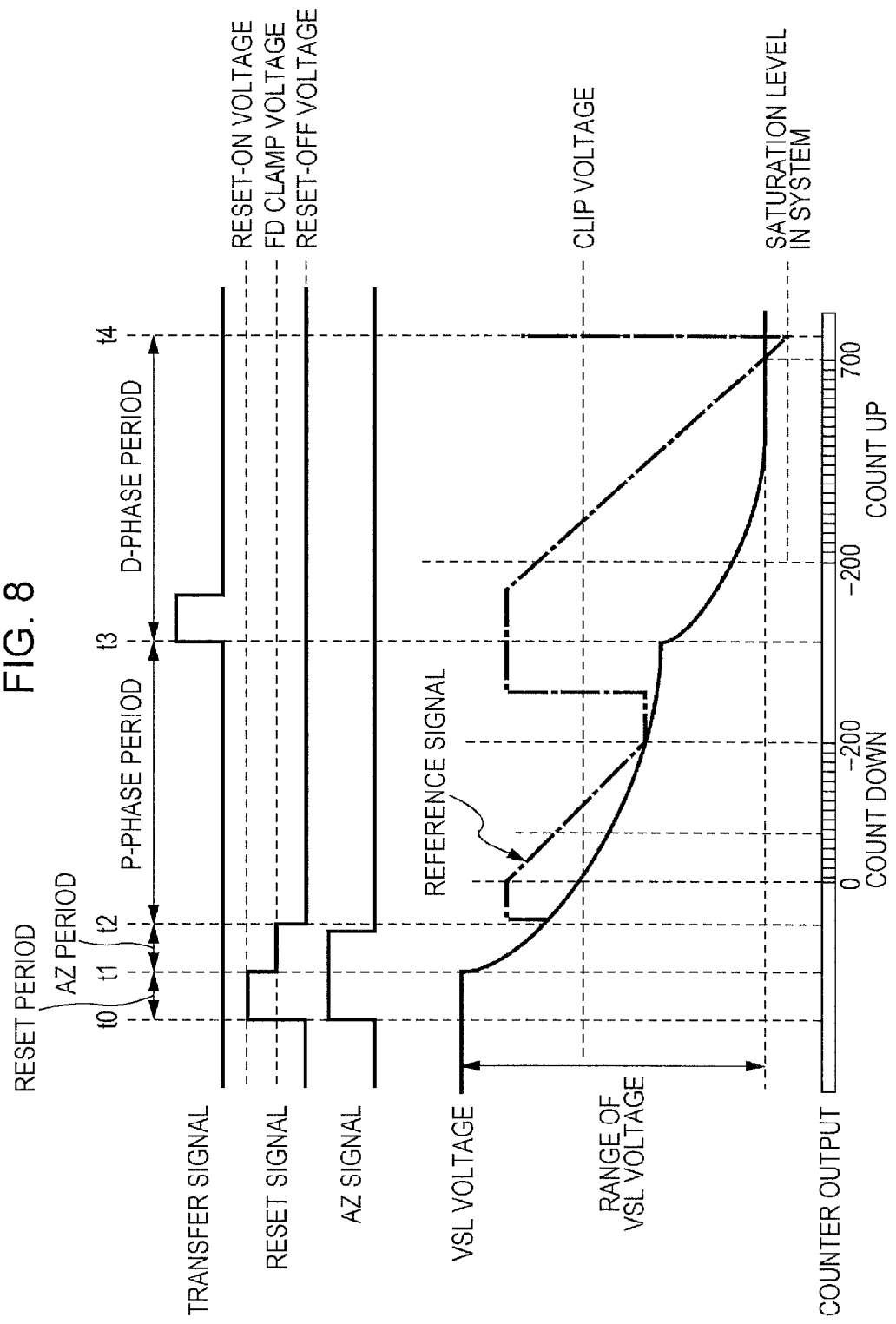

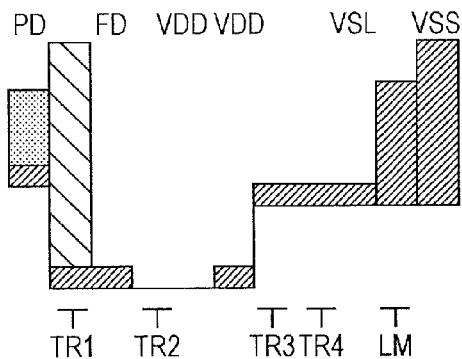
FIG. 9A
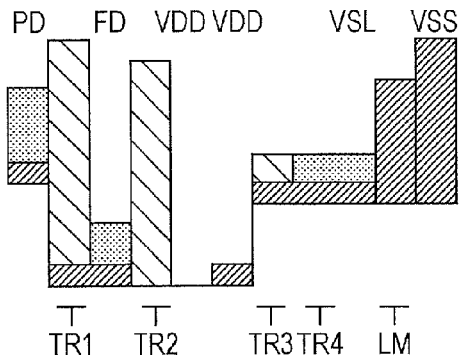
FIG. 9C
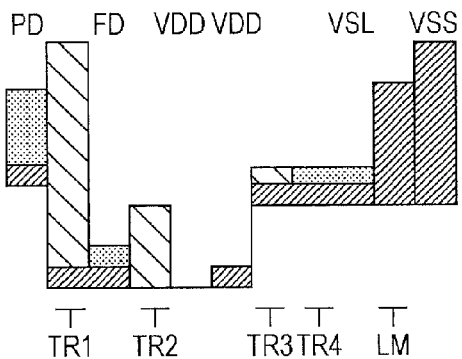
FIG. 9B
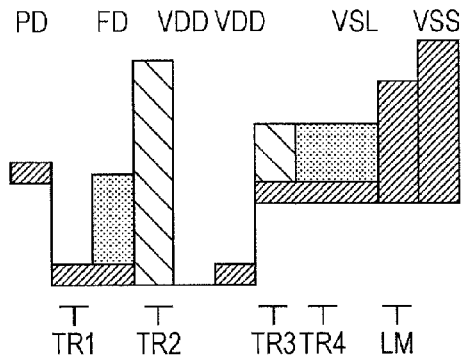
FIG. 9D
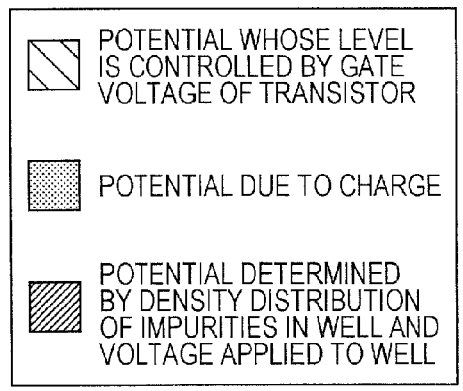

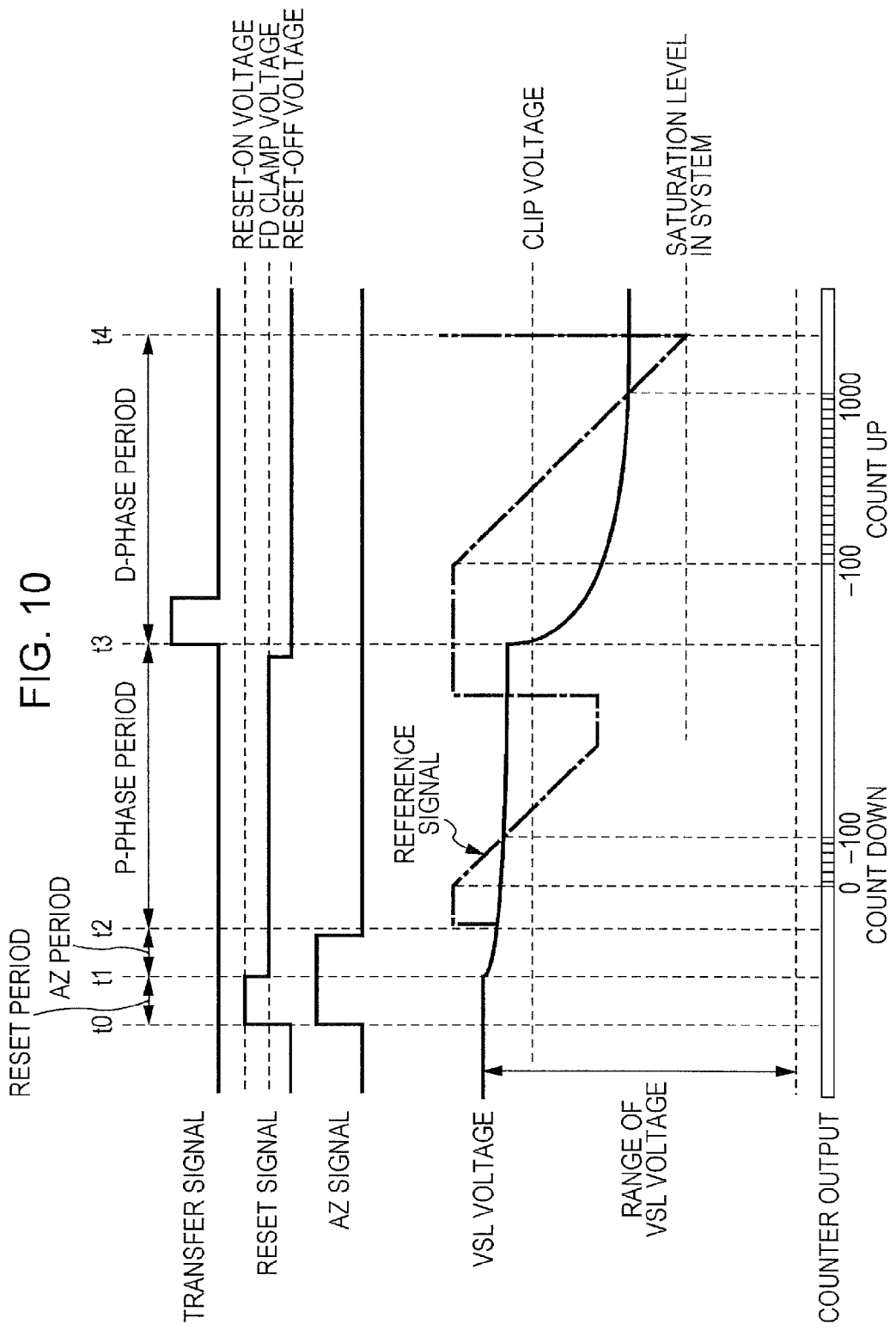

FIG. 11A
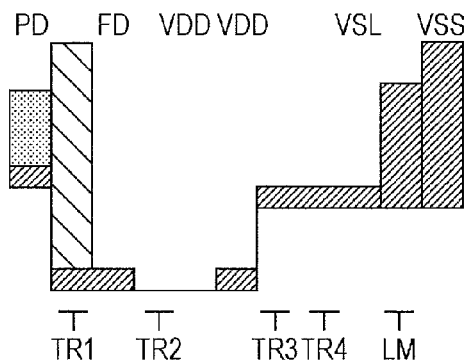
FIG. 11C
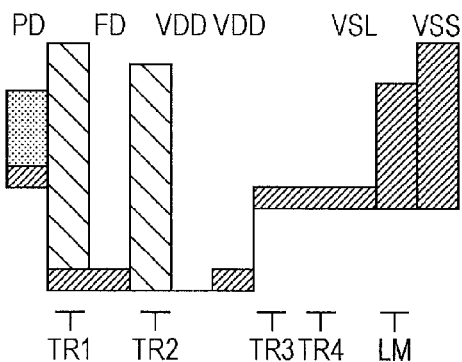
FIG. 11B
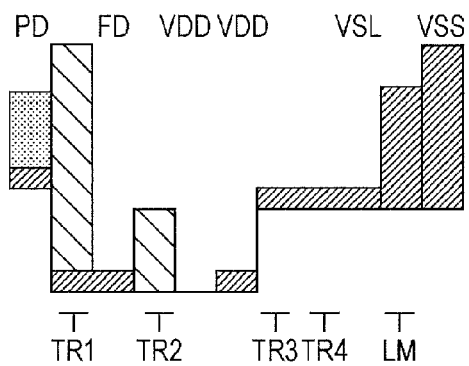
FIG. 11D
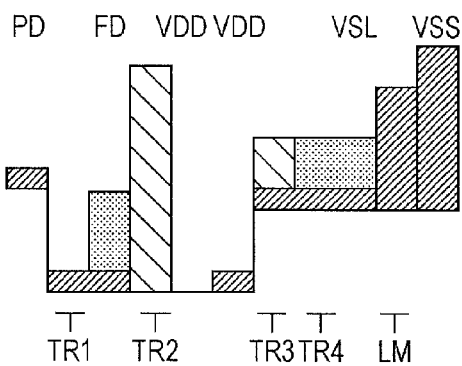
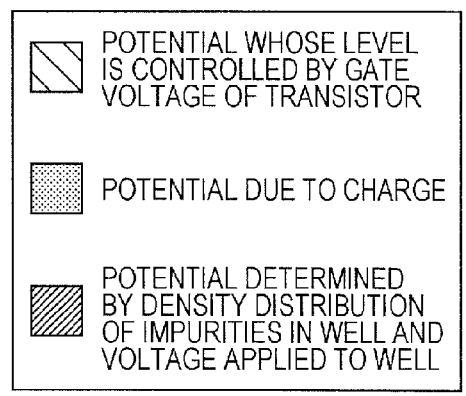

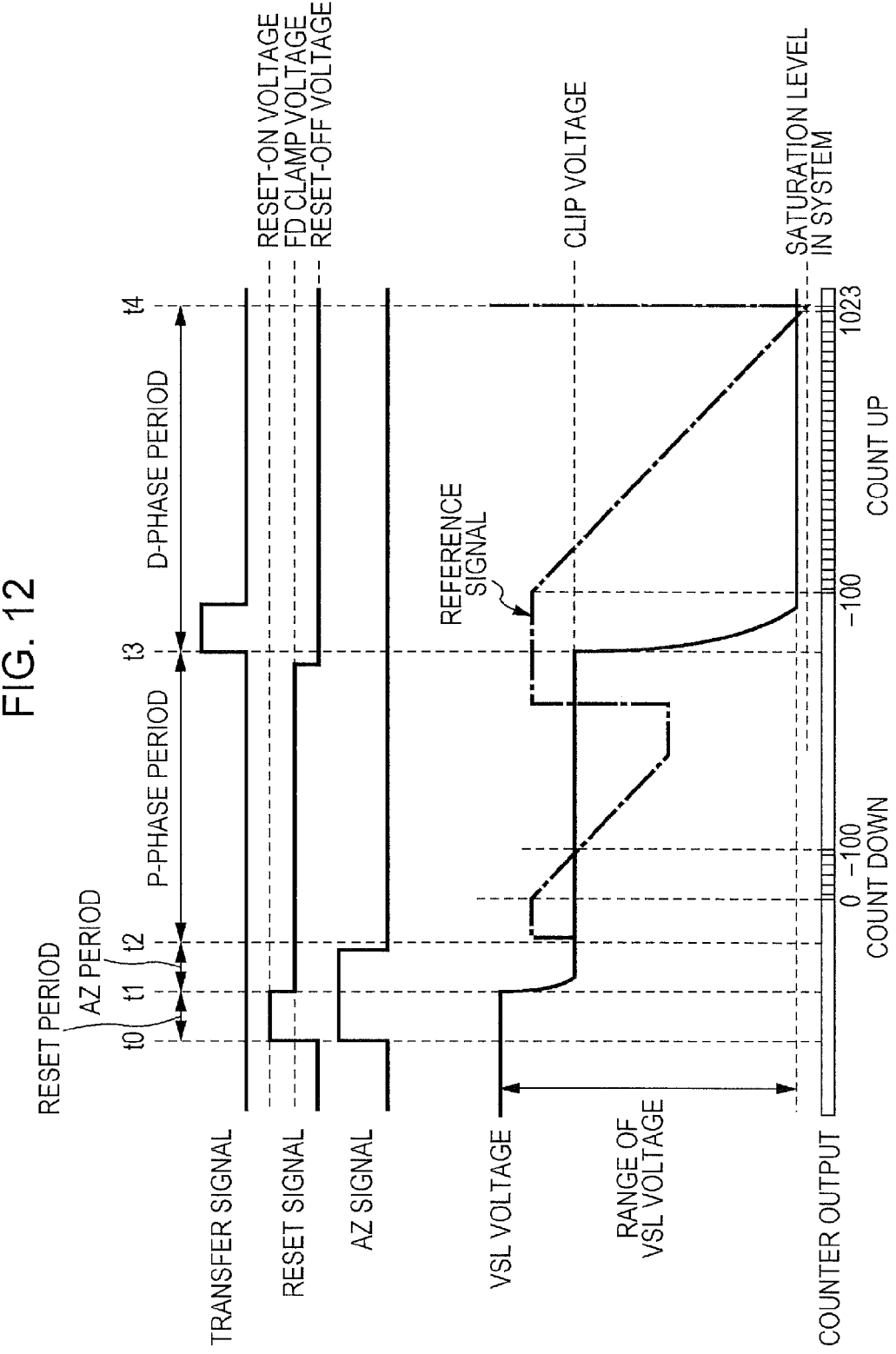

FIG. 13A
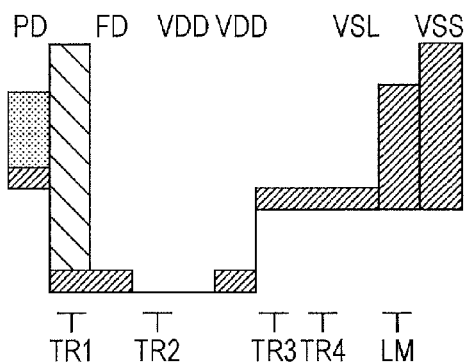
FIG. 13C
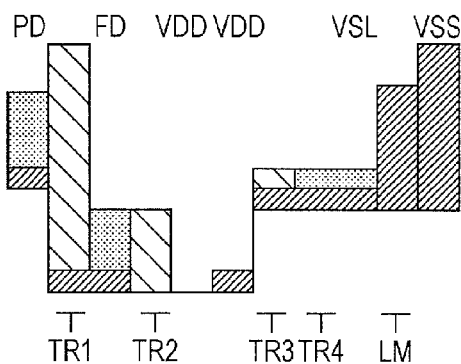
FIG. 13B
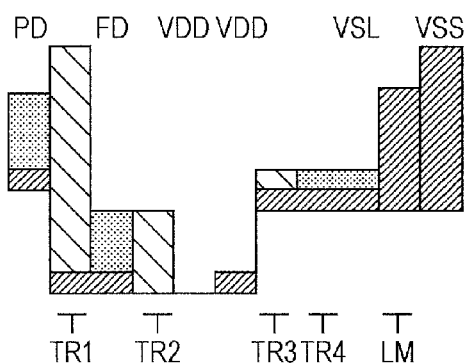
FIG. 13D
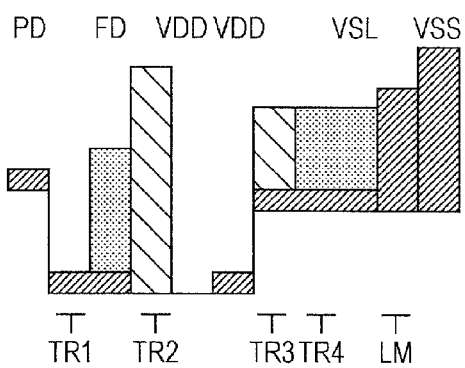
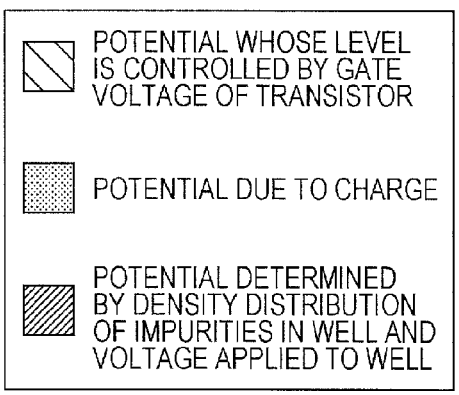

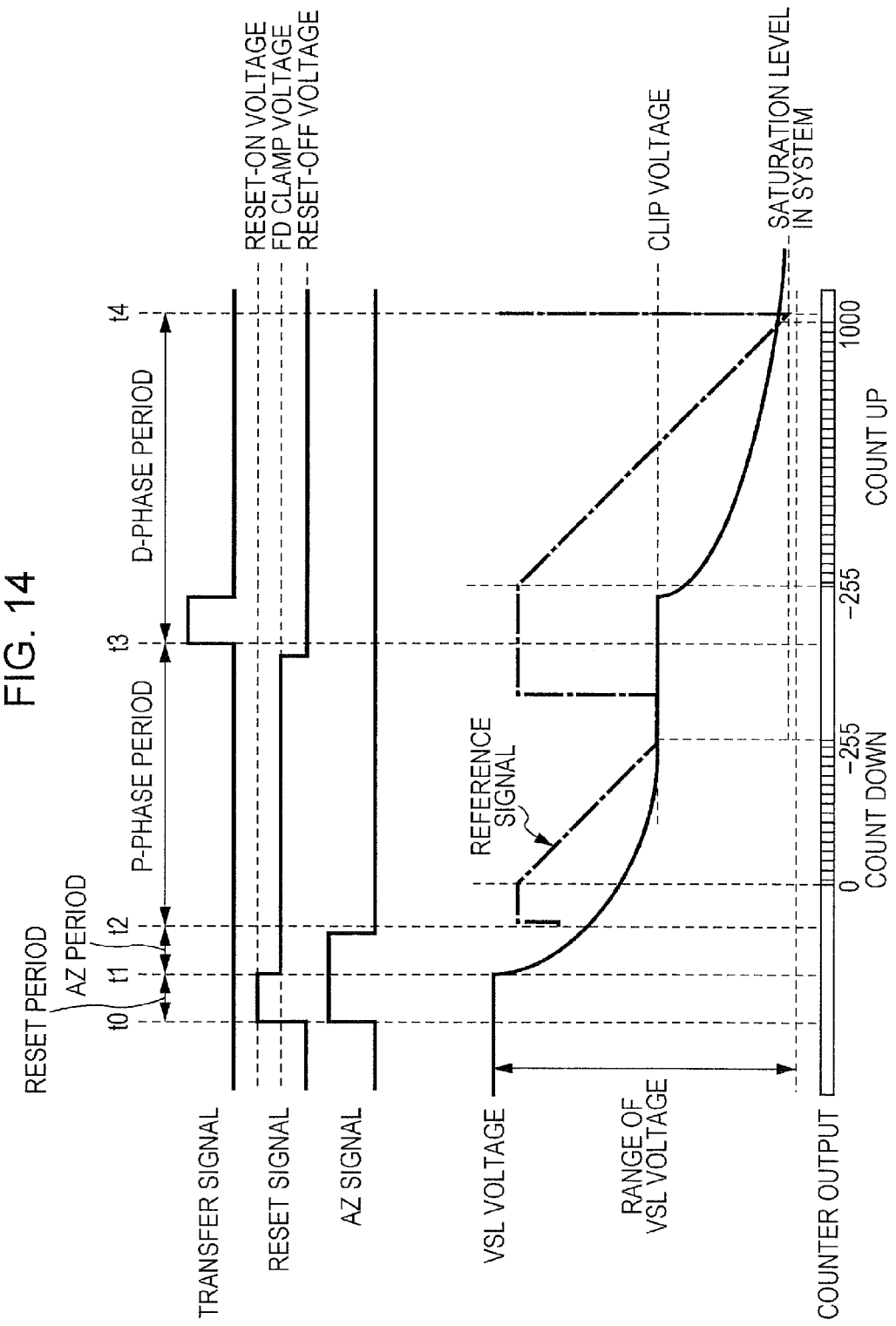

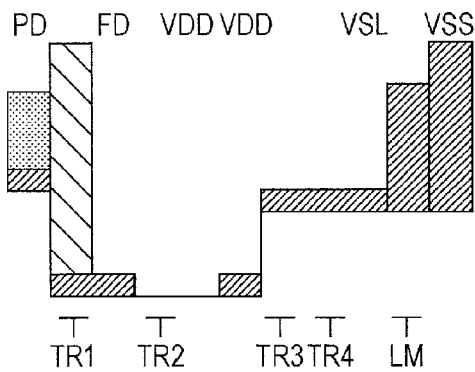
FIG. 15A
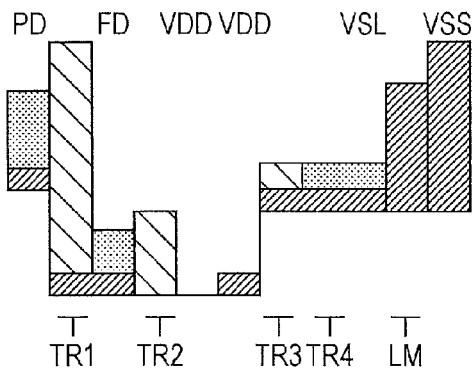
FIG. 15C
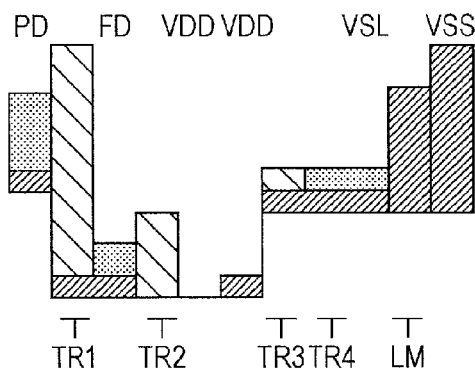
FIG. 15B
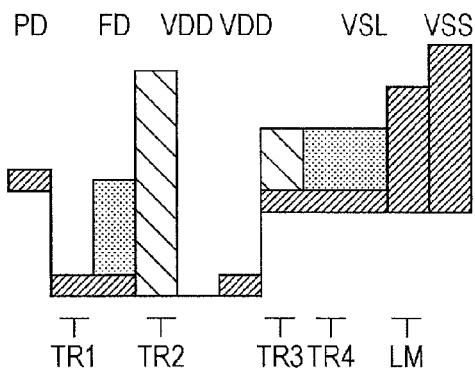
FIG. 15D
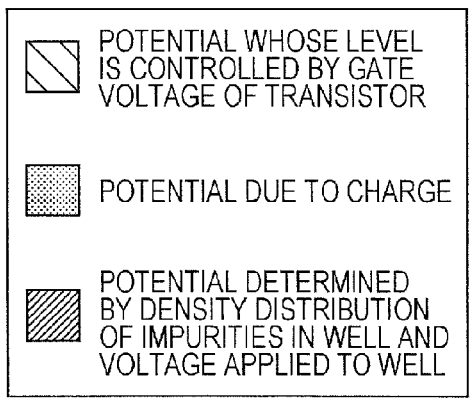

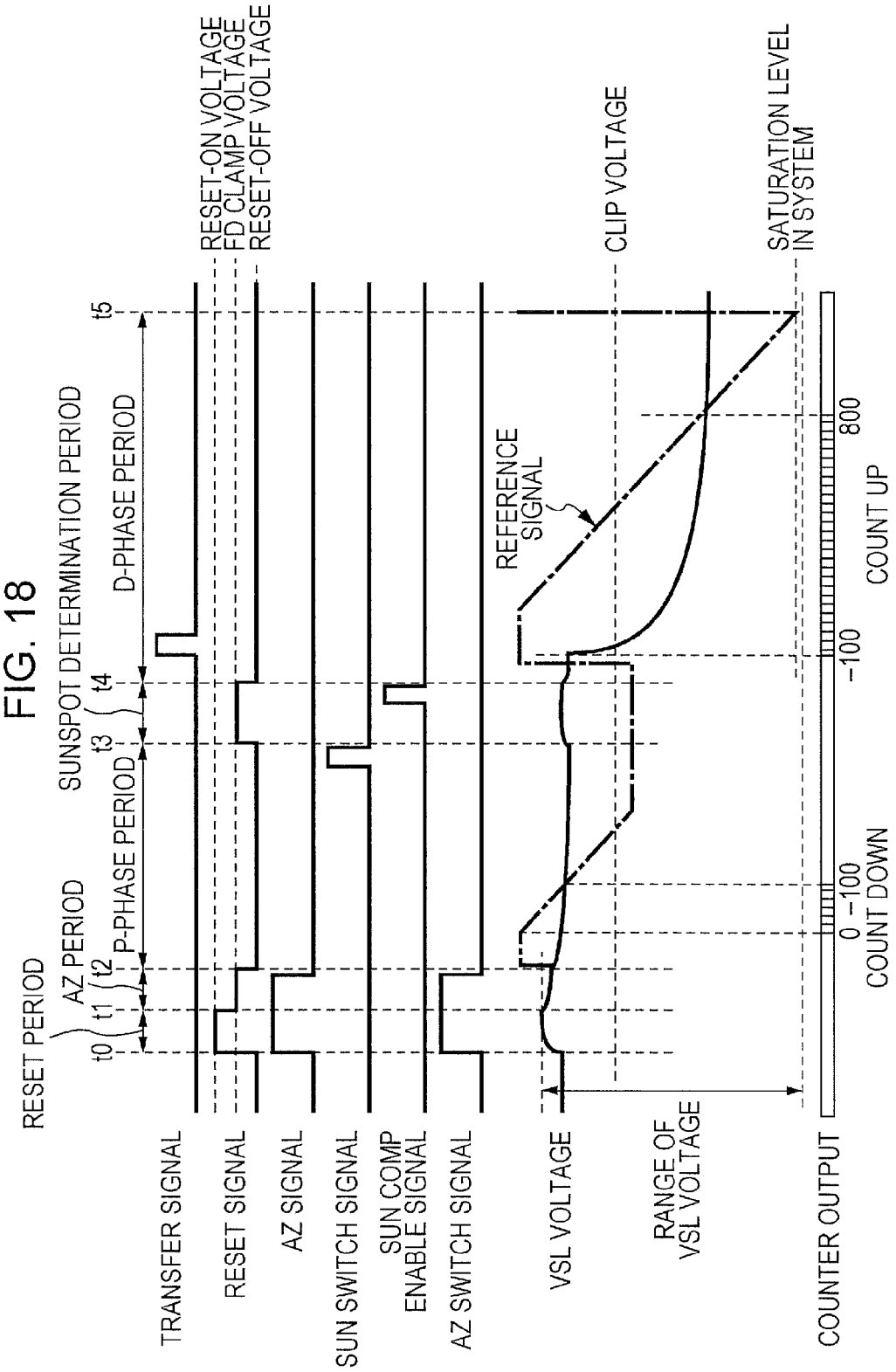

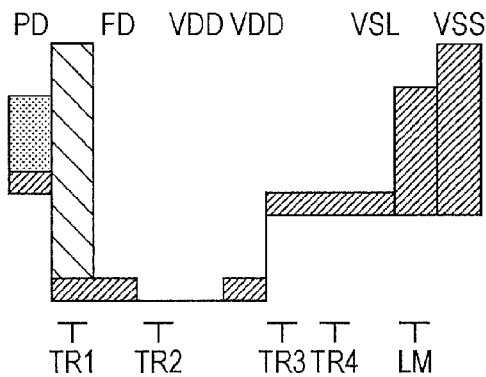
FIG. 19A
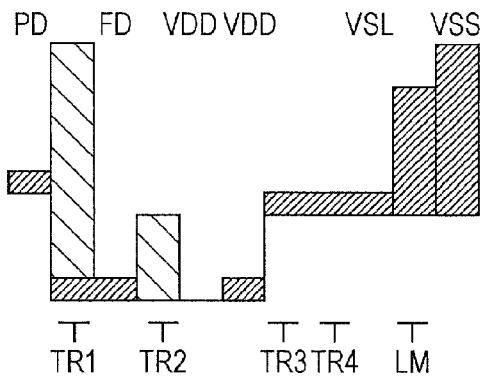
FIG. 19D
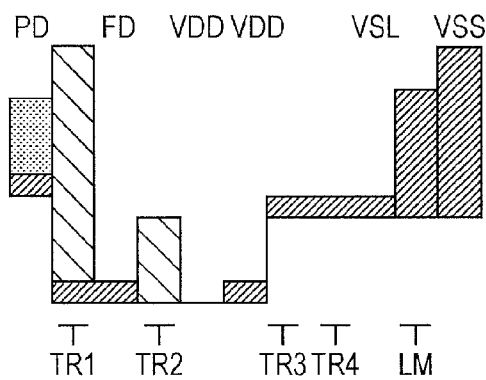
FIG. 19B
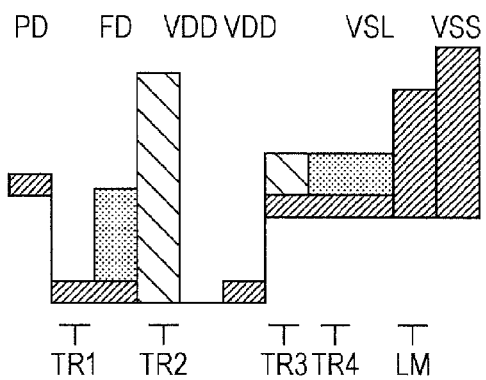
FIG. 19E
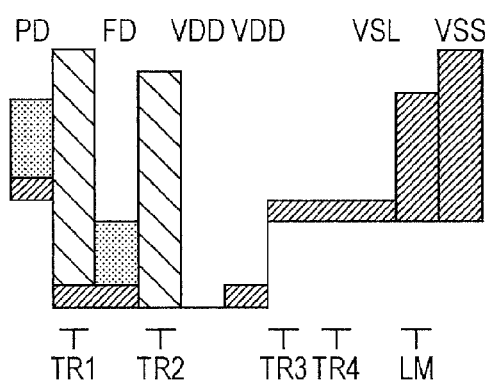
FIG. 19C
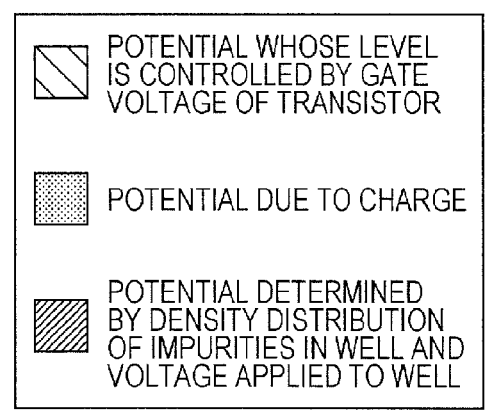

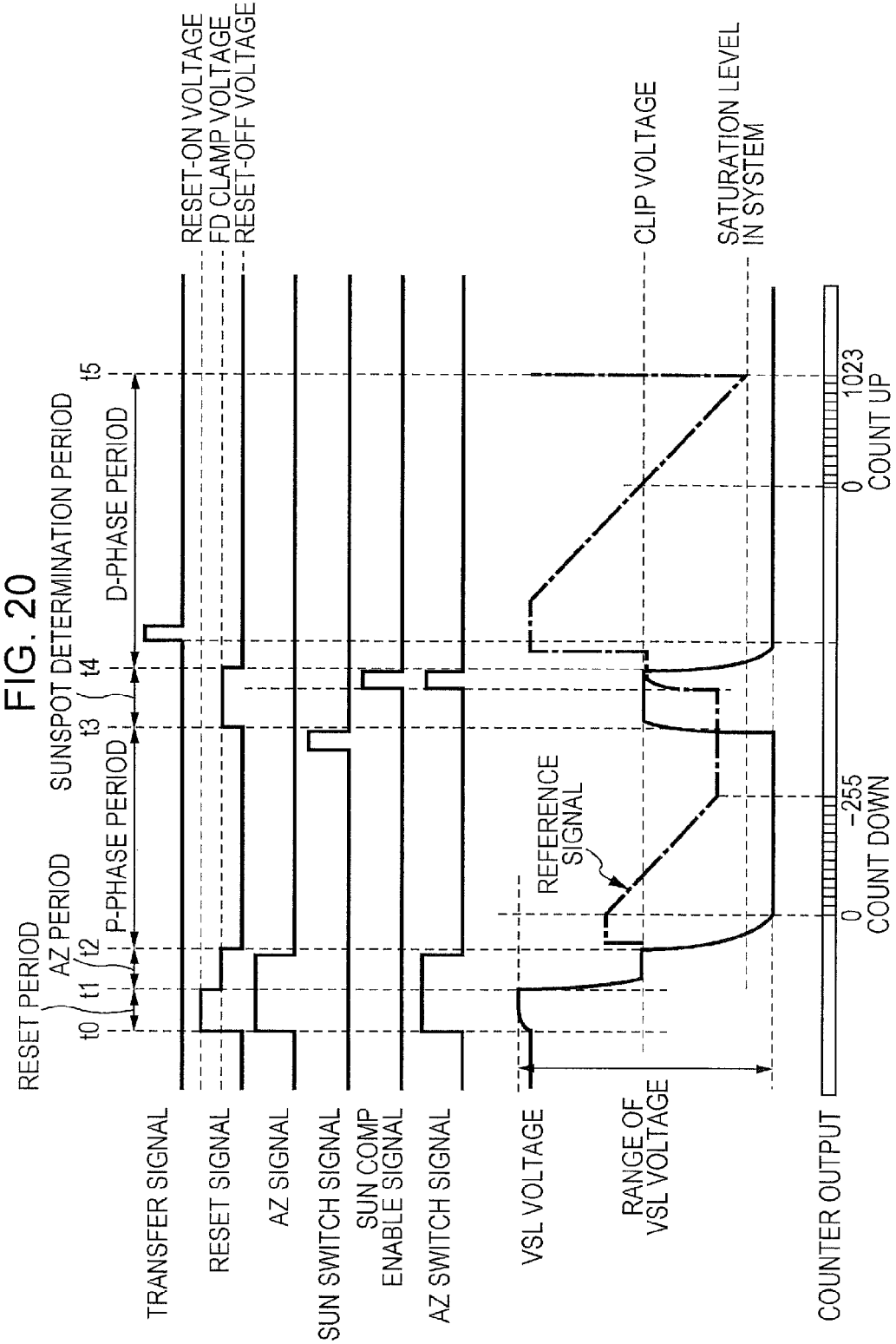

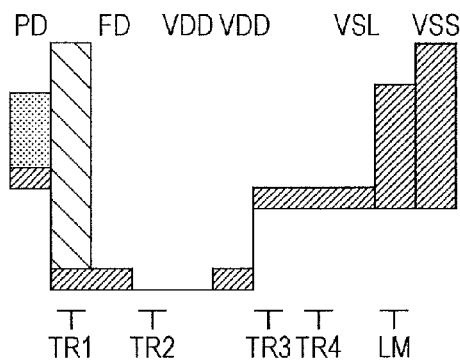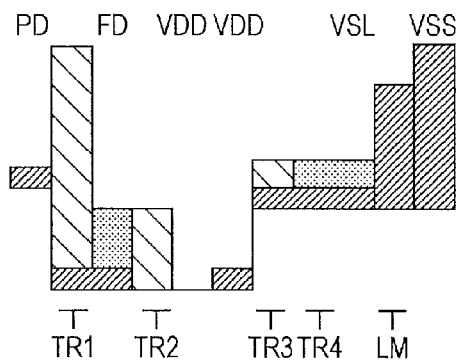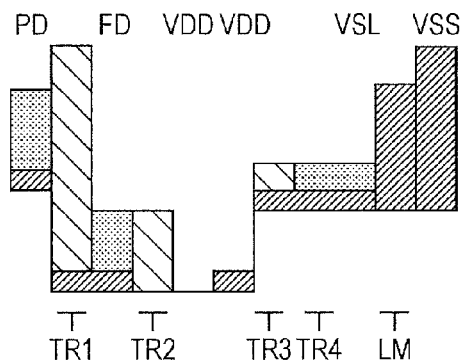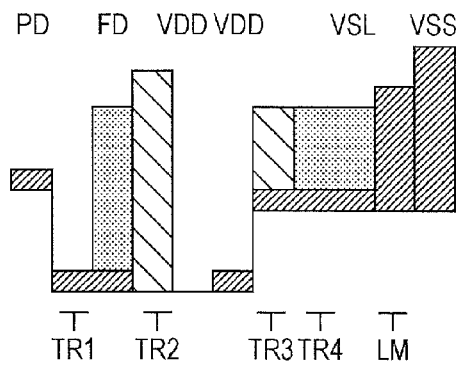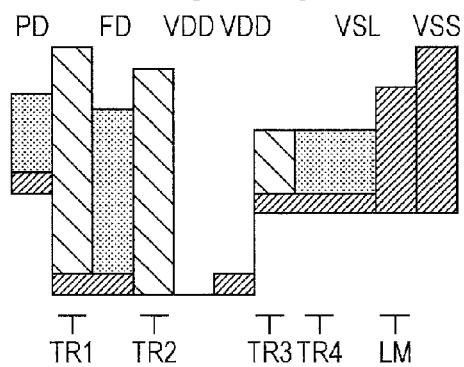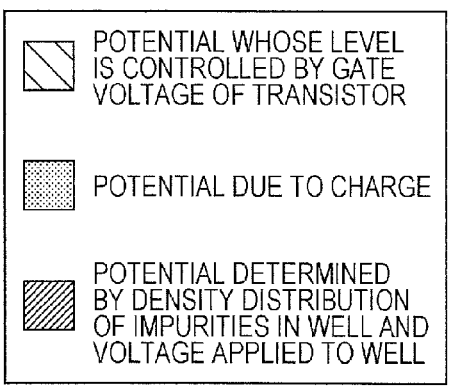

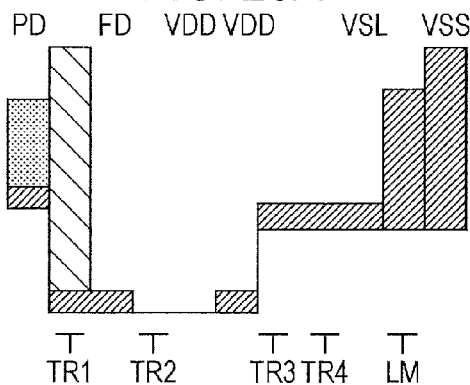
FIG. 23A
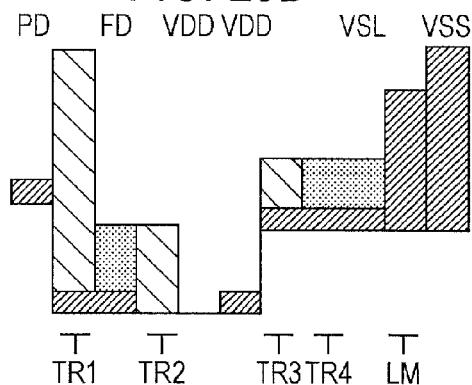
FIG. 23D
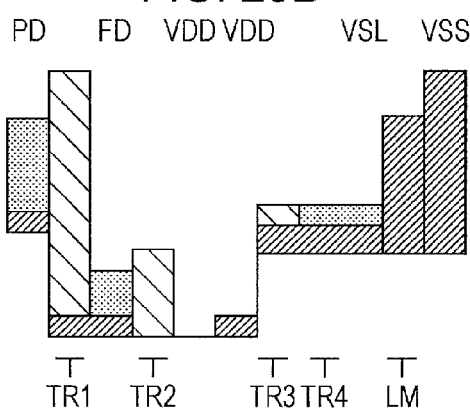
FIG. 23B
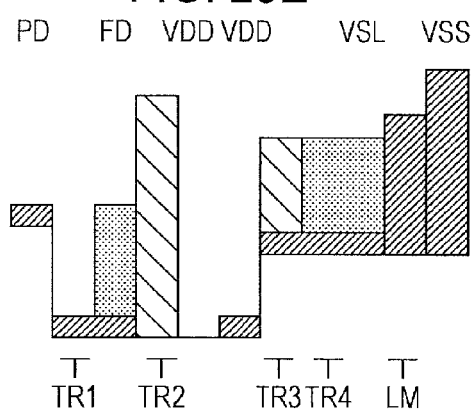
FIG. 23E
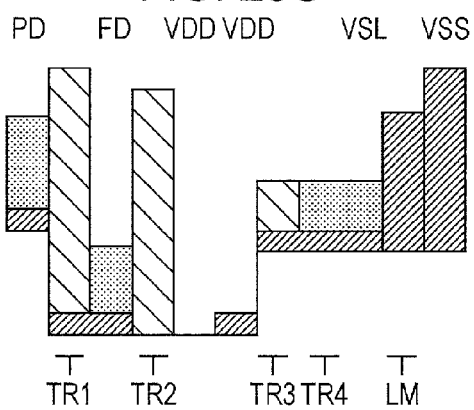
FIG. 23C
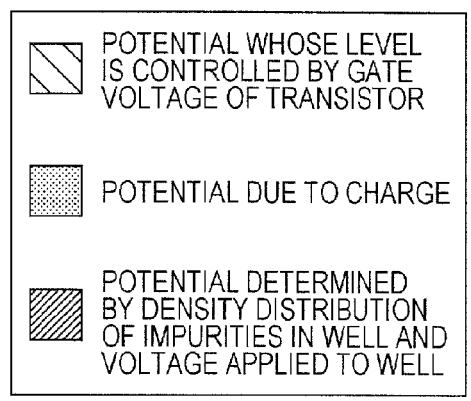

SOLID-STATE IMAGE CAPTURE DEVICE AND CONTROL METHOD AND CONTROL PROGRAM THEREFOR

BACKGROUND

The present disclosure relates to solid-state image capture devices. In particular, the present disclosure relates to a solid-state image capture device that is capable of avoiding a phenomenon that a pixel that is supposed to provide a white signal when excessive light is incident on the pixel is determined to exhibit a white signal (this phenomenon is called a "black sun effect").

In CMOS (complementary metal-oxide semiconductor) image sensors, the "black sun effect" occurs (this effect is referred to as a "black sinking effect" in Japanese Unexamined Patent Application Publication No. 2007-195033 and is referred to as "blackening effect" in Japanese Unexamined Patent Application Publication No. 2008-67344). The term "black sun effect" refers to the phenomenon that, when very strong light, such as sunlight, is incident on a pixel, an output signal becomes absent suddenly and a portion that is supposed to provide a white signal is recorded as a black signal. Japanese Unexamined Patent Application Publication Nos. 2007-195033 and 2008-67344 discloses technologies for addressing the phenomenon.

In Japanese Unexamined Patent Application Publication No. 2007-195033, a clamp power source is connected to a so-called "correlated double sampling circuit" via a clamp transistor and the correlated double sampling circuit has a clamp capacitor for clamping a voltage output from a pixel via a vertical signal line. Immediately after the pixel is reset, the clamp transistor is turned on to thereby clamp an output voltage of the vertical signal line to the clamp capacitor with reference to the clamp voltage, and in other periods, the clamp transistor is turned off to thereby clip the connection node of the clamp transistor and the clamp capacitor.

In Japanese Unexamined Patent Application Publication No. 2008-67344, a clip circuit is connected to a vertical signal line. This clip circuit does not vary the voltage of the vertical signal line when the voltage of the vertical signal line is higher than a predetermined voltage (VCLIP1) and performs adjustment so that the voltage of the vertical signal line becomes equal to the predetermined voltage (VCLIP1) when the voltage of the vertical signal line is lower than the predetermined voltage (VCLIP1).

SUMMARY

In the technologies described above, a power-supply voltage that is irrevenent to each pixel is utilized to clamp the voltage of the vertical signal line and this clamp voltage is deemed to have a constant value. However, for a pixel using a floating diffusion, since the level of the floating diffusion is affected by transistor parameters (the capacitance of the floating diffusion, threshold voltages of the gates of an amplification transistor and a load MOS, and a drain-source current), the value of the level varies.

Thus, the potential (FD reset level) of the vertical signal line when the floating diffusion is reset and the potential (clamp level) when the clamp circuit clamps the potential of the vertical signal line are likely to cause a mismatch. Thus, when the technologies of Japanese Unexamined Patent Application Publication Nos. 2007-195033 and 2008-67344 are used, an appropriate clamp level varies from one lot (or chip) to another even for the same product and thus the same clamp voltage is not settable.

Now, a case in which, owing to the mismatch, the clamp level is too high compared to the FD reset level is discussed. There are cases in which the voltage of the vertical signal line immediately before the correlated double sampling is performed becomes too high relative to the original level. In such cases, at the onset of a decrease in the potential of the vertical signal during a first phase of the correlated double sampling, even when the actual pixel signal exhibits a black level, there is a possibility that a count value is out of a count range, depending on variations in the transistor parameters.

Conversely, a case in which, owing to the aforementioned mismatch, the clamp level is too low compared to the FD reset level is now discussed. When the voltage of the vertical signal line immediately before the correlated double sampling is performed becomes too low relative to the original level, a problem can arise when light that is incident on the corresponding pixel has an intermediate intensity between the intensity of a sunspot and the intensity in a normal state. That is, when the count value is within the count range in the first phase of the correlated double sampling, a margin up to a low-limit value of a voltage that can be assumed by the vertical signal line is not obtained and there is a possibility that a signal value that is supposed to exhibit white exhibits gray.

When any of above-described technologies for dealing with a sunspot by clamping the voltage of the vertical signal is used, chips whose setting values for setting the clamp voltage for the voltage of the vertical signal lines do not fit into a proper range are sorted out as process variations. This processing causes yield deterioration. When any of the technologies is not used, a subsequent logic circuit performs signal processing for each frame to compensate for the sunspot. Consequently the circuit scale increases.

The present disclosure has been described in view of the forgoing problems, and it is desirable to provide a solid-state image capture device that is capable of more appropriately compensating for a sunspot and a control method and a control program for the solid-state image capture device.

In order to overcome the above-described problem, there is provided a solid-state image capture device according to an embodiment of the present technology. The solid-state image capture device including: a pixel including a photoelectric conversion element configured to convert light into signal charge and first to fourth switch elements; a reference-signal generator configured to generate a reference signal that changes with time; and an analog-to-digital converter configured to generate a digital signal corresponding to an analog signal output by the pixel, by using a comparator having a first input terminal connected to the pixel and a second input terminal connected to the reference-signal generator. The photoelectric conversion element is connected to a predetermined connection point via the first switch element, the predetermined connection point is connected to a predetermined constant-voltage source via the second switch element and is connected to the first input terminal via the third switch element, and the first input terminal and the second input terminal are connected via the fourth switch element. During acquirement of a digital signal corresponding to an amount of light received by the photoelectric conversion element, the second switch element is turned on to reset a voltage of the predetermined connection point, the fourth switch element is turned on while a connection degree of the second switch element is in an intermediate state between an on state and an off state to cause the first input terminal and the second input terminal to reach a same potential, the second switch element is not turned on and the third switch element is turned on to cause the analog-to-digital converter to convert the reset voltage of the predetermined connection point into a digital signal, and the second switch element is not turned on and the first switch element and the third switch element are turned on to cause the analog-to-digital converter to convert a voltage corresponding to the signal charge generated by the photoelectric conversion element into a digital signal.

The solid-state image capture device may take various forms, such as a form in which the solid-state image capture device is incorporated into other equipment and a form in which the solid-state image capture device is implemented in conjunction with another method. The present technology can also be realized as an image capture system having the solid-state image capture device, a solid-state image-capture device control method having processes corresponding to the above-described device configuration, a control program for causing the solid-state image capture device corresponding to the above-described device configuration, a computer-readable recording medium on which the program is recorded, and so on.

According to the present technology, it is possible to more appropriately compensate for a sunspot.

BRIEF DESCRIPTION OF THE DRAWINGS

FIG. 4 is a diagram illustrating a sequence of signal lines during reading from a pixel when ordinary light is incident;

FIGS. 5A to 5D illustrate potentials of the pixel at timings illustrated in FIG. 4;

FIGS. 7A to 7D illustrate potentials of the pixel at timings illustrated in FIG. 6;

FIG. 8 is a diagram illustrating a sequence of the signal lines during reading from a pixel when intermediate light is incident;

FIGS. 9A to 9D illustrate potentials of the pixel at timings illustrated in FIG. 8;

FIG. 10 is a diagram illustrating a sequence of the signal lines during reading from a pixel when the ordinary light is incident;

FIGS. 11A to 11D illustrate potentials of the pixel at timings illustrated in FIG. 10;

FIG. 12 is a diagram illustrating a sequence of the signal lines during reading from a pixel when the excessive light is incident;

FIGS. 13A to 13D illustrate potentials of the pixel at timings illustrated in FIG. 12;

FIG. 14 is a diagram illustrating a sequence of the signal lines during reading from a pixel when the intermediate light is incident;

FIGS. 15A to 15D illustrate potentials of the pixel at timings illustrated in FIG. 14;

FIG. 18 is a diagram illustrating a sequence of the signal lines during reading from a pixel when the ordinary light is incident;

FIGS. 19A to 19E illustrate potentials of the pixel at timings illustrated in FIG. 18;

FIG. 20 is a diagram illustrating a sequence of the signal lines during reading from a pixel when the excessive light is incident;

FIGS. 21A to 21E illustrate potentials of the pixel at timings illustrated in FIG. 20;

FIGS. 23A to 23E illustrate potentials of the pixel at timings illustrated in FIG. 22.

DETAILED DESCRIPTION OF EMBODIMENTS

Figure 1:
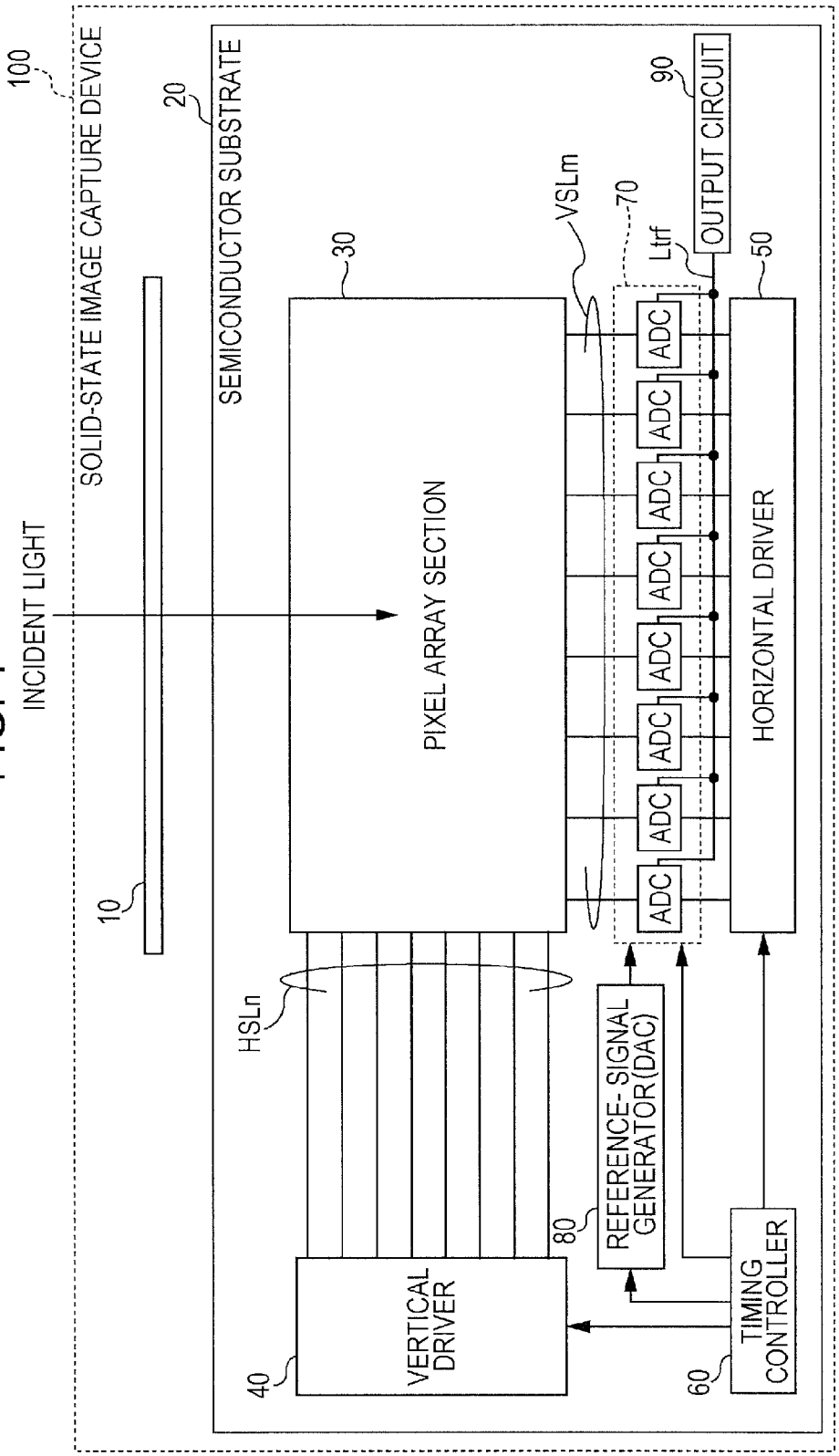
FIG. 1 is a block diagram illustrating the configuration of a solid-state image capture device.

The present technology is described below in the following order:

(1) Configuration of Solid-State Image Capture Device
(2) First Example of Operation of Solid-State Image Capture Device
(3) Second Example of Operation of Solid-State Image Capture Device
(4) Modifications of Configuration of Solid-State Image Capture Device
(5) Third Example of Operation of Solid-State Image Capture Device
(6) Summary (1) CONFIGURATION OF SOLID-STATE IMAGE CAPTURE DEVICE FIG. 1 is a block diagram illustrating the configuration of a solid-state image capture device. In the present embodiment, a CMOS image sensor, which is one type of X-Y address type solid-state image capture device will be described as one example of an image capture device.

A specific example of a solid-state image capture device will be described below with reference to FIG. 1. In FIG. 1, a solid-state image capture device 100 includes a color filter array 10 and a semiconductor substrate 20.

The semiconductor substrate 20 has a pixel array section 30, a vertical driver 40, a horizontal driver 50, a timing controller 60, a column processor 70, a reference-signal generator 80, and an output circuit 90. The reference-signal generator 80 may hereinafter be referred to as a "DAC 80".

A digital arithmetic unit may also be provided prior to the output circuit 90, as appropriate. The digital arithmetic unit may be provided, for example, when processing for thinning out pixel signals in a horizontal direction and/or a vertical direction is performed by addition, averaging, or the like.

Pixels PXL including photodiodes, which serve as photoelectric conversion elements, are arranged in the pixel array section 30 in a matrix. The pixel array section 30 has, at its light-receiving surface, the color filter array 10 in which filter colors are divided so as to correspond to the pixels PXL. A specific circuit configuration of the pixels PXL is described below in detail.

In the pixel array section 30, n pixel drive lines HSLn (n is an integer greater than or equal to 2) and m vertical signal lines VSLm (m is an integer greater than or equal to 2) are wired. The pixel drive lines HSLn are provided at regular intervals along left-and-right directions in FIG. 1 (i.e., in directions in which the pixels in pixel rows are arranged or in horizontal directions) and the vertical signal lines VSLm are wired at regular intervals along up-and-down directions in FIG. 1 (i.e., in directions in which the pixels in pixel columns are arranged or in vertical directions).

Ends of the pixel drive lines HSLn are connected to output terminals corresponding to the respective rows in the vertical driver 40. Ends of the vertical signal lines VSLm are connected to ADC circuit 71m (m is an integer greater than or equal to 2) corresponding to the respective vertical signal lines VSLm in the column processor 70. Specific wiring of the pixel drive lines HSLn and the vertical signal lines VSLm will be described in conjunction with a description of unit pixels described below.

The vertical driver 40, the horizontal driver 50, the timing controller 60, and so on constitute a drive controller, which is provided outside the pixel array section 30, to control sequential reading of signals from the pixels included in the pixel array section 30.

The timing controller 60 has a timing generator and a communication interface. The timing generator generates various clock signals on the basis of an externally input clock (master clock). The communication interface receives, for example, data for requesting an operation mode, the data being supplied from outside of the semiconductor substrate 20, and outputs data including internal information of the solid-state image capture device 100.

On the basis of the master clock, the timing controller 60 generates a clock having the same frequency as the master clock, a clock obtained by dividing the frequency of the clock into halves, a low-speed clock obtained by further dividing the frequency, and so on. The timing controller 60 then supplies those clocks to the individual elements, for example, the vertical driver 40, the horizontal driver 50, the column processor 70, and so on, in the solid-state image capture device 100.

The vertical driver 40 includes a shift register, an address decoder, and so on. The vertical driver 40 further has a vertical-address setter for controlling row addresses and a row-scan controller for controlling row scanning on the basis of signals resulting from decoding of externally input video signals. The vertical driver 40 can perform read scanning and sweep scanning.

The read scanning refers to scanning for sequentially selecting unit pixels from which signals are to be read. The scanning is basically sequentially performed row by row. However, when thinning out of the pixels is to be performed by adding or averaging outputs of multiple pixels that have a predetermined positional relationship, the scanning is performed in a predetermined order.

In the sweep scanning, the unit pixels belonging to the row or a pixel combination from which signals are to be read in the read scanning are reset earlier than the read scanning by an amount of time corresponding to the shutter speed.

The horizontal driver 50 sequentially selects the ADC circuits 71m in the column processor 70 in synchronization with the clock output from the timing controller 60 to guide the signals to a horizontal signal line (a horizontal output line) Ltrf.

The horizontal driver 50 includes, for example, a horizontal-address setter and a horizontal scanner. The horizontal-address setter specifies a read column in the horizontal direction (i.e., selects the individual ADC circuit in the column processor 70). The horizontal scanner guides signals of the column processor 70 to the horizontal signals line Ltrf in accordance with the read address specified by the horizontal-address setter.

As a result of the selection and scanning performed by the horizontal scanner, pixel signals signal-processed by the ADC circuits 71m included in the column processor 70 are sequentially output to the output circuit 90 through the horizontal signal line Ltrf.

The reference-signal generator 80 has a DAC (digital analog converter). In synchronization with a count clock supplied from the timing controller 60, the reference-signal generator 80 generates a saw-toothed wave (a ramp waveform) that changes in a stepped manner with time, on the basis of an initial value supplied from the timing controller 60. The reference-signal generator 80 then supplies the saw-toothed wave to the individual ADC circuits 71m in the column processor 70 as a reference signal.

The ADC circuits 71m in the column processor 70 are provided for the respective vertical signal lines VSLm to convert analog signals, output from the respective vertical signal lines VSLm, into digital signals, and to output the digital signals to the horizontal signal line Ltrf in accordance with control of the horizontal driver 50.

When the ADC circuits 71m and their internal elements (comparators 73m and counters 74m) are described below without reference numerals corresponding to m, the descriptions thereof are assumed to be common to all of the ADC circuits.

Signals corresponding to a color layout of the color filter array 10 are supplied from the pixel array section 30 to the output circuit 90 via the column processor 70. The output circuit 90 performs arithmetic processing to perform processing for converting the signals corresponding to the color layout of the color filter array 10.

[Pixel Configuration]

Figure 2:
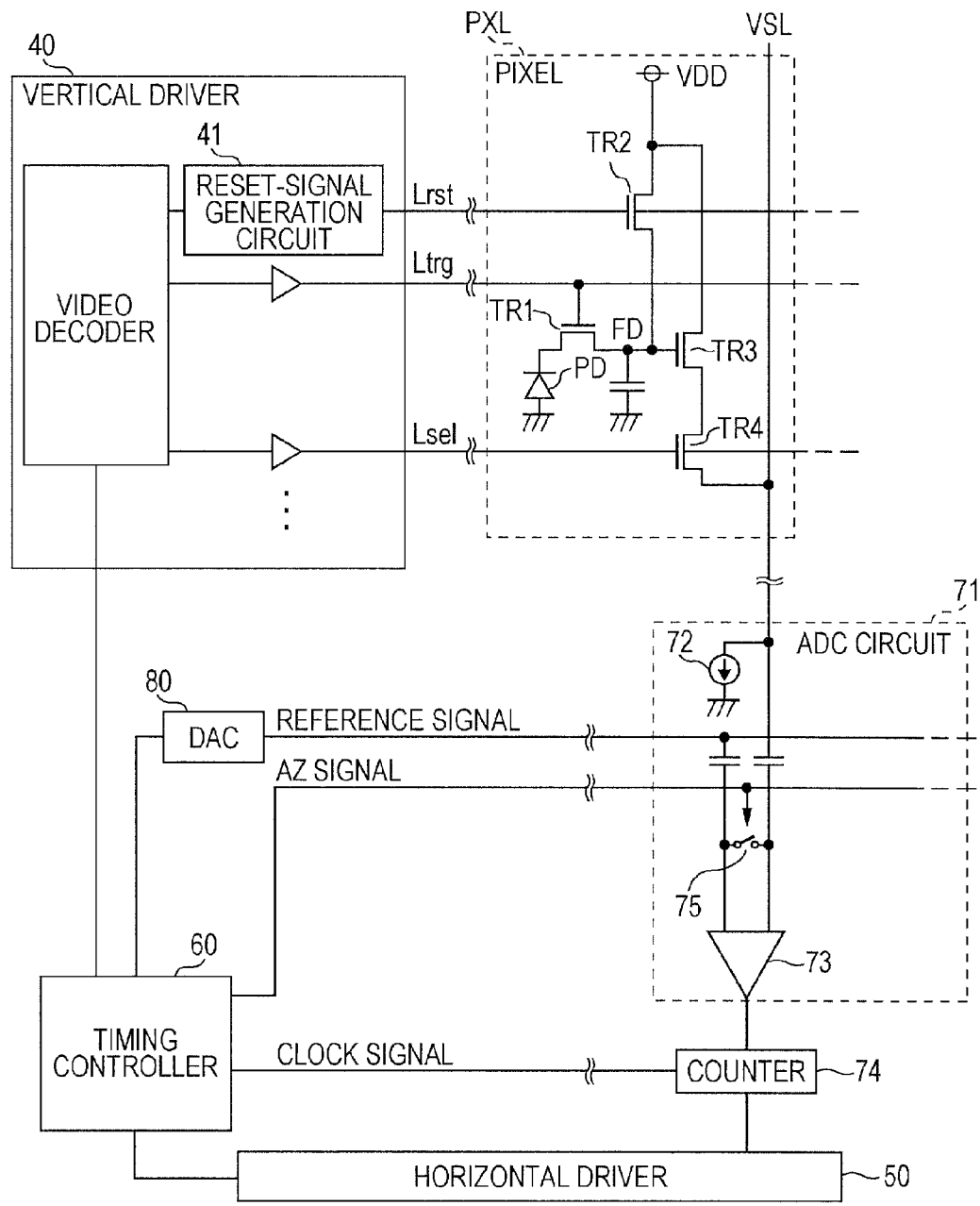
FIG. 2 is a diagram illustrating a circuit configuration of a column processor and a pixel.

FIG. 2 is a diagram illustrating a circuit configuration of a column processor and a pixel. In FIG. 2, one pixel and one ADC circuit are illustrated for simplicity of description. The circuit configuration of the pixel is depicted as an equivalent circuit.

In FIG. 2, a pixel PXL has a typical four-transistor structure and includes a photodiode PD and four transistors, namely, a transfer transistor TR1, a reset transistor TR2, an amplification transistor TR3, a selection transistor TR4.

In the present embodiment, the transfer transistor TR1 corresponds to a first switch element, the reset transistor TR2 corresponds to a second switch element, the selection transistor TR4 corresponds to a third switch element, and the ADC circuit corresponds to an AD converter.

Various control signals output from a reset-signal generation circuit 41 and drivers in the vertical driver 40 are input to the pixel PXL through signal lines Ltrg, Lrst, and Lsel.

The photodiode PD performs photoelectric conversion to generate current corresponding to the amount of received light. The photodiode PD has an anode connected to ground and a cathode connected to a drain of the transfer transistor TR1.

The signal line Ltrg for a transfer gate signal is connected to a gate of the transfer transistor TR1. A source of the transfer transistor TR1 is connected to a connection point of a source of the reset transistor TR2 and a gate of the amplification transistor TR3. The connection point provides a floating diffusion FD that servers a capacitor for accumulating signal charge.

When the transfer signal is input to the gate of the transfer transistor TR1 through the signal line Ltrg, the transfer transistor TR1 is turned on to transfer signal charge (photoelectrons, in this case), accumulated by the photoelectric conversion of the photodiode PD, to the floating diffusion FD.

The signal line Lrst for a reset signal is connected to a gate of the reset transistor TR2 and a constant-voltage source VDD is connected to a drain of the reset transistor TR2. When the reset signal is input to the gate of the reset transistor TR2 through the signal line Lrst, the reset transistor TR2 is turned on to reset a voltage of the floating diffusion FD to a voltage of the constant-voltage source VDD. Herein, the term "voltage" is used to mean a potential difference from the potential of ground of equipment into which the solid-state image capture device 100 is incorporated.

When the reset signal is not input to the gate of the reset transistor TR2 through the signal line Lrst, the reset transistor TR2 is turned off to form a predetermined potential barrier between the floating diffusion FD and the constant-voltage source VDD. When the amount of charge accumulated in the floating diffusion FD is smaller than or equal to the amount of charge corresponding to the potential barrier, movement of the charge from the floating diffusion FD to the constant-voltage source VDD is inhibited.

The gate of the amplification transistor TR3 is connected to the floating diffusion FD, a drain of the amplification transistor TR3 is connected to the constant-voltage source VDD, and a source of the amplification transistor TR3 is connected to a drain of the selection transistor TR4.

The signal line Lsel for a selection signal is connected to a gate of the selection transistor TR4 and the vertical signal line VSL is connected to the source of the selection transistor TR4. When a control signal (an address signal or a select signal) is input to the gate of the selection transistor TR4 through the signal line Lsel, the selection transistor TR4 is turned on. When the control signal is not input to the gate of the selection transistor TR4 through the signal line Lsel, the selection transistor TR4 is turned off.

When the selection transistor TR4 is turned on, the amplification transistor TR3 amplifies the voltage of the floating diffusion FD and outputs the amplified voltage to the vertical signal line VSL. The voltage output from the corresponding pixel through the vertical signal line VSL is input to the column processor 70.

[ADC Circuit]

As illustrated in FIG. 2, the ADC circuit 71 has a constant-current source 72, a comparator 73, a counter 74, and an AZ (auto zero) switch 75.

The constant-current source 72 and the selection transistor TR4 in the pixel PXL constitute a source follower. When the selection transistor TR4 is turned on, the constant-current source 72 serves as a load current source for causing constant current to flow to the pixel PXL.

A reference signal generated by the reference-signal generator 80 is input to one input terminal of the comparator 73 via a DC-cutting capacitor. An analog pixel signal output from the pixel through the vertical signal line VSL is input to another input terminal of the comparator 73 via a DC-cutting capacitor.

In the present embodiment, the one input terminal of the comparator 73 corresponds to a first input terminal and the other input terminal corresponds to a second input terminal.

The comparator 73 compares the reference signal with the pixel signal. The comparator 73 is adapted to output a high-level or low-level signal in accordance with a magnitude relationship between the reference signal and the pixel signal. When the magnitude relationship between the reference signal and the pixel signal is reversed, the level of the signal output is reversed between the high level and the low level.

A clock is supplied from the timing controller 60 to the counter 74, which counts the time from the start of the AD conversion to the end thereof (i.e., counts a count-operation effective period). The timings of the start and the end of the AD conversion are determined based on the timing at which the reference signal changes or the reversal of the level of the output of the comparator 73.

The counter 74 performs A/D (analog-to-digital) conversion on the pixel signal by using the so-called "correlated double sampling (CDS)". More specifically, while an analog signal corresponding to a reset component is output from the vertical signal line VSLm, the counter 74 performs a down-count operation in accordance with control of the timing controller 60, and while an analog signal corresponding to a signal component is output from the vertical signal line VSLm, the counter 74 performs an up-count operation, which is opposite to the case in which the analog signal corresponding to a reset component is output.

As a result of the count operation, a count value is generated. The count value is a digital value corresponding to a difference between a signal component and a reset component and also represents the signal component obtained by correcting digital data corresponding to the analog pixel signal, input from the pixel to the column processor 70 through the vertical signal line VSLm, by using the reset component. The digital data generated by the counter 74 is output to the output circuit 90 via the horizontal signal line Ltrf.

The two input terminals of the comparator 73 are connected so that they can be short-circuited by the AZ switch 75. The on and off of the AZ switch 75 are controlled based on an AZ signal output from the timing controller 60. When the AZ switch 75 is turned on, the two input terminals of the comparator 73 assume the same potential. In the present embodiment, the AZ switch 75 corresponds to a fourth switch element.

With this arrangement, a potential difference due to an offset between the pixel signal and the reference signal input to the comparator 73 is cancelled, so that the pixel signal and the reference signal reach the same potential. This operation is hereinafter referred to as an "AZ (auto zero) operation".

[Vertical Driver]

The solid-state image capture device 100 has the reset-signal generation circuit 41 as a circuit for generating various reset signals to be input to the reset transistor TR2 through the signal line Lrst.

Figure 3:
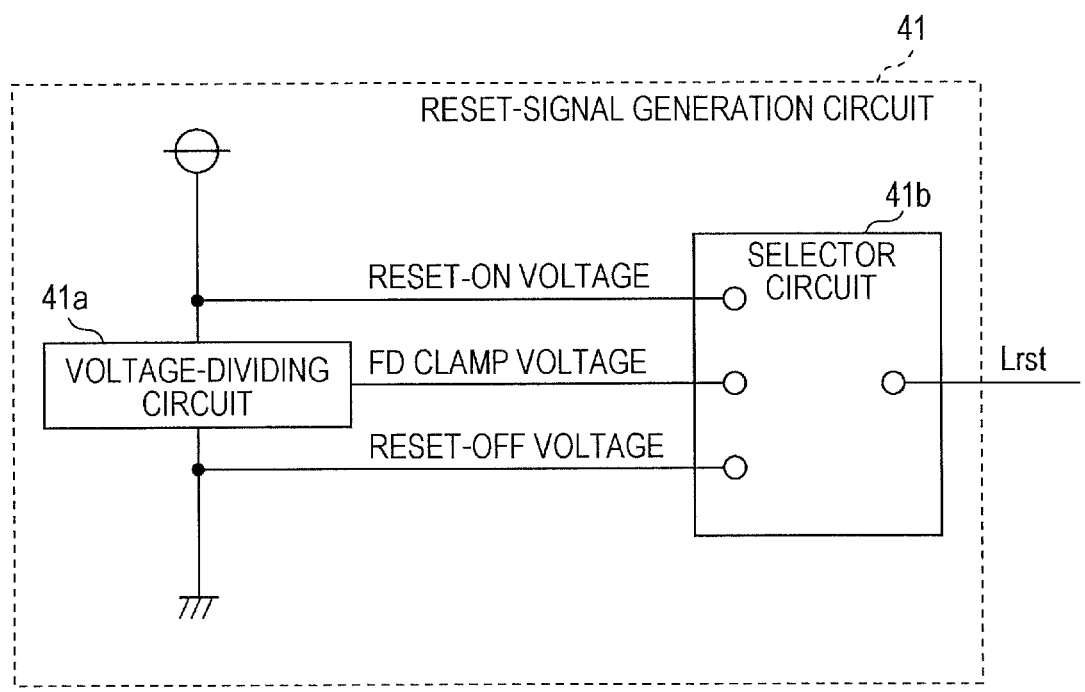
FIG. 3 illustrates one example of a reset-signal generation circuit.

FIG. 3 illustrates one example of the reset-signal generation circuit 41. As illustrated in FIG. 3, the reset-signal generation circuit 41 has a voltage-dividing circuit 41a and a selector circuit 41b.

For example, two types of voltage, i.e., a high voltage and a low voltage corresponding to a reset-on voltage and a reset-off voltage, are externally supplied to the reset-signal generation circuit 41. The voltage-dividing circuit 41a in the reset-signal generation circuit 41 divides the two types of voltage to generate an FD clamp voltage, which is an intermediate voltage between the reset-on voltage and the reset-off voltage.

The selector circuit 41b supplies a voltage, selected from three types of voltage, i.e., the reset-on voltage, the reset-off voltage, and the FD clamp voltage, to the reset transistor TR2 as a reset signal.

The reset-on voltage is a voltage that completely turns on the reset transistor TR2. When the reset-on voltage is applied to the gate of the reset transistor TR2, the potential barrier between the drain and the source thereof disappears and the constant-voltage source VDD and the floating diffusion FD assume the same potential.

The reset-off voltage is a voltage that completely turns off the reset transistor TR2. When the reset-off voltage is applied to the gate of the reset transistor TR2, the reset transistor TR2 forms the predetermined potential barrier between the drain and the source thereof, and ideally, electrically breaks the connection between the constant-voltage source VDD and the floating diffusion FD illustrated in FIG. 2.

The potential barrier formed between the drain and the source of the reset transistor TR2 by the reset-off voltage is hereinafter referred to as a "first-level potential barrier".

The FD clamp voltage is an intermediate voltage between the reset-on voltage and the reset-off voltage and incompletely turns on the reset transistor TR2. This incomplete-on state is hereinafter referred to as a "half-on state". When the FD clamp voltage is applied to the gate of the reset transistor TR2, a potential barrier having a lower potential than the potential when the reset-off voltage is applied to the gate of the reset transistor TR2 is formed between the drain and the source thereof.

The potential barrier formed between the drain and the source of the reset transistor TR2 by the FD clamp voltage is hereinafter referred to as a "second-level potential barrier".

When the reset transistor TR2 forms the second-level potential barrier, charge exceeding the potential barrier is not accumulated in the floating diffusion FD. That is, the amount of the charge accumulated in the floating diffusion FD (i.e., the voltage of the floating diffusion FD) can be clamped to an amount that is smaller than or equal to an amount corresponding to the FD clamp voltage.

As described above, the reset-signal generation circuit 41 is configured so that it can selectively output at least three different voltages including two types of externally input voltage and the internally generated voltage. Thus, by appropriately selecting the reset signal, the reset-signal generation circuit 41 can change a connection degree of the reset transistor TR2. The number of types of internally generated voltage may be increased so as to allow selective outputting of four or more types of voltage.

(2) FIRST EXAMPLE OF OPERATION OF SOLID-STATE IMAGE CAPTURE DEVICE (2-1) CDS Operation when Ordinary Light is Incident An operation of the solid-state image capture device 100 described above will be described next. A first example of the operation of the solid-state image capture device 100 when ordinary light is incident will first be described with reference to FIGS. 4 and 5A to 5D. FIG. 4 illustrates a sequence of the signal lines during reading from a pixel when ordinary light is incident and FIGS. 5A to 5D illustrate potentials of the pixel at timings illustrated in FIG. 4.

Hereinafter, light having a level at which the black sun effect occurs is referred to as "excessive light", light having a level at which the black sun effect does not occur is referred to as "ordinary light", and light having an intermediate level between the excessive light and the ordinary light is referred to as "intermediate light".

In FIG. 4 and subsequent potential diagrams described below, PD represents the potential of charge generated according to the amount of light received by the photodiode PD, FD represents the potential of charge accumulated in the floating diffusion FD, TR2 represents the potential barrier that the reset transistor TR2 forms between the floating diffusion FD and a constant-voltage source VDD, TR3 represents a potential barrier that the amplification transistor TR3 forms between the constant-voltage source VDD and the selection transistor TR4, TR4 represents a potential barrier that the selection transistor TR4 forms between the amplification transistor TR3 and the vertical signal line VSL, VSL represents a potential corresponding to the voltage of the vertical signal line VSL, and LM represents a potential formed by the constant-current source 72.

<Reset Period>

In a pixel-reading operation, the charge accumulated in the floating diffusion FD is first swept. The period in which the charge is swept is hereinafter referred to as a "reset period". In FIG. 4, the period of t0 to t1 corresponds to the reset period.

More specifically, in the reset period, a reset pulse corresponding to the above-described reset-on voltage is applied to a pixel to be processed. As a result, as illustrated in FIG. 5A, the reset transistor TR2 is turned on to thereby remove the potential barrier that the reset transistor TR2 forms between the constant-voltage source VDD and the floating diffusion FD. As a result, the floating diffusion FD is electrically connected to the constant-voltage source VDD and is reset to a predetermined level.

In the reset period, a selection pulse (a selection-on signal) is also applied to the pixel to be processed. In response, the amplification transistor TR3 and the selection transistor TR4 are also turned on, so that the potential barriers that the amplification transistor TR3 and the selection transistor TR4 form between the constant-voltage source VDD and the vertical signal line VSL are removed as illustrated in FIG. 5A. As a result, the vertical signal line VSL is electrically connected to the constant-voltage source VDD and is reset to a predetermined level.

In the present embodiment, an AZ operation, which is executed in an AZ period described below, is also executed in the reset period. Thus, in the reset period, a potential difference between the voltage of the vertical signal line VSL and a reference signal VREF, the voltage and the reference signal VREF being input to the comparator 73, is also cancelled. That is, it is possible to further enhance an advantage of the AZ operation executed in the AZ period executed subsequently to the reset period.

In the reset period, a transfer pulse (a transfer-on signal) is not applied to the pixel to be processed. Thus, the transfer transistor TR1 is turned off, so that the transfer transistor TR1 forms a potential barrier between the photodiode PD and the floating diffusion FD, as illustrated in FIG. 5A. That is, the charge generated according to the amount of light received by the photodiode PD does not flow into the floating diffusion FD.

The difference between the voltage of the vertical signal line VSL, the voltage being reset as described above, and the voltage having a lower limit that can be assumed by the vertical signal line VSL corresponds to the range of the voltage that can be assumed by the vertical signal line VSL. The voltage of the vertical signal line VSL is hereinafter referred to as a "VSL voltage".

<AZ Period>

When the reset period is finished, the AZ operation for cancelling the potential difference between the two input terminals of the comparator 73 is executed. In the present embodiment, since the AZ operation is also executed in the reset period, as described above, the AZ operation is executed for a predetermined amount of time (T1 to T2) subsequent to the reset period.

As a result of the AZ operation, the potential difference between the pixel signal VSL and the reference signal VREF input to the comparator 73 is cancelled, so that subsequent signal comparison processing can be performed accurately. The predetermined amount of time (t1 to t2) in which the AZ operation is performed is hereinafter referred to as an "AZ period".

In the AZ period, a reset pulse corresponding to the above-described FD clamp voltage is applied to the pixel to be processed. Thus, the reset transistor TR2 enters the above-described half-on state, so that the above-described second-level potential barrier is formed between the constant-voltage source VDD and the floating diffusion FD, as illustrated in FIG. 5B.

As a result, the upper limit of the charge accumulated in the floating diffusion FD is defined by the above-described second-level potential barrier. That is, when the charge is at the level that does not exceed the potential barrier, the charge is accumulated in the floating diffusion FD, and when the charge accumulated in the floating diffusion FD reaches the level that exceeds the potential barrier, the charge flows out of the floating diffusion FD.

As a result, the voltage of the floating diffusion FD is clamped so that it does not decrease to a voltage that is lower than a voltage corresponding to the above-described second-level potential barrier. This is because, in the present embodiment, minus charge, i.e., electrons, is accumulated in the floating diffusion FD. The voltage clamped as described above is hereinafter referred to as a "VSL clamp voltage".

In the AZ period, the selection pulse (the selection-on signal) is applied to the pixel to be processed, subsequently to the reset period. Thus, the amplification transistor TR3 and the selection transistor TR4 are in the on states, and as illustrated in FIG. 5B, the vertical signal line VSL assumes a voltage obtained by amplifying the voltage of the floating diffusion FD, the amplification being performed by the amplification transistor TR3. The voltage of the vertical signal line VSL when the floating diffusion FD has the VSL clamp voltage is hereinafter referred to as a "clip voltage".

In the AZ period, the transfer pulse (the transfer-on signal) is not applied to the pixel to be processed, subsequently to the reset period. Thus, the transfer transistor TR1 is turned off, so that the state in which the transfer transistor TR1 forms the potential barrier between the photodiode PD and the floating diffusion FD is maintained as illustrated in FIG. 5B.

Thus, in the AZ period, the charge generated according to the amount of light received by the photodiode PD does not flow into the floating diffusion FD. However, as illustrated in FIG. 4, weak blooming occurs even when the ordinary light is incident, so that, in the AZ period, a small amount of charge is accumulated in the floating diffusion FD and the VSL voltage decreases slightly.

In the present embodiment, the charge that is caused to flow into the floating diffusion FD by the blooming noise induced by the ordinary light and having a level removable by the CDS can be stored in the floating diffusion FD.

More specifically, the FD clamp voltage that defines the VSL clamp voltage is determined empirically considering the charge that is caused to flow into the floating diffusion FD by the blooming noise induced by the ordinary light. The FD clamp voltage is set at a level at which the range in which the voltage of the floating diffusion FD can be varied by the blooming noise is covered.

That is, the noise generated by the ordinary light does not cause charge having a level that exceeds the above-described second-level potential barrier to be generated in the floating diffusion FD, and in this case, the voltage of the floating diffusion FD does not reach the VSL clamp voltage or lower.

<P-Phase Period>

When the AZ period is finished, the voltage of the pixel that has been reset is measured. The period in which the voltage of the pixel that has been reset is measured is hereinafter referred to as a "P-phase period". In a broad sense, the P-phase period is a period before the charge generated by the photodiode PD is transferred to the floating diffusion FD, and corresponds to the period of t2 to t3 in FIG. 4. In a narrow sense, however, the P-phase period may be set to a period obtained by excluding a margin period for DAC stabilization from the period of t2 to t3.

In the P-phase period, since the reset pulse is not applied to the pixel to be processed, the reset transistor TR2 is in the off state. That is, the above-described first-level potential barrier is formed between the constant-voltage source VDD and the floating diffusion FD, as illustrated in FIG. 5C, and the upper limit of the charge accumulated in the floating diffusion FD is defined by the first-level potential barrier.

The first-level potential barrier is adapted to have a level that is not exceeded by the charge that can be accumulated in the floating diffusion FD. Accordingly, no charge flows from the floating diffusion FD to the constant-voltage source VDD beyond the reset transistor TR2.

In the P-phase period, the transfer pulse (the transfer-on signal) is not applied to the pixel to be processed, subsequently to the reset period. Thus, the transfer transistor TR1 is turned off, so that the state in which the transfer transistor TR1 forms the potential barrier between the photodiode PD and the floating diffusion FD is maintained as illustrated in FIG. 5C. As a result, the charge generated according to the amount of light received by the photodiode PD does not flow into the floating diffusion FD.

In the P-phase period, since the selection pulse (the selection-on signal) is applied to the pixel to be processed, subsequently to the reset period, the selection transistor TR4 is in the on state. That is, the VSL voltage becomes a voltage obtained by amplifying the voltage of the floating diffusion FD, the amplification being performed by the amplification transistor TR3.

In FIG. 5C, since almost no charge is accumulated in the floating diffusion FD, the VSL voltage is also substantially "0". In addition, when the ordinary light is incident on the solid-state image capture device 100, noise induced by a factor other than a sunspot causes the charge to flow into the floating diffusion FD, but the black sun effect does not occur. Thus, the VSL voltage does not exceed the VSL clamp voltage.

The reference voltage used during measurement of the pixel voltage in the P-phase period is set so that the range in which the reference voltage varies includes a range in which the VSL voltage is varied by the noise. Thus, a first phase of correlated double sampling can be properly performed except when the excessive light that may cause the black sun effect is incident.

The example illustrates in FIG. 4 corresponds to a case when the ordinary light is incident on the solid-state image capture device 100, and in this case, noise induced by a factor other than a sunspot causes the charge to flow into the floating diffusion FD, but the black sun effect does not occur. Thus, without dropping to the clip voltage, the VSL voltage crosses the reference signal when the counter 74 counts down to "−100".

<D-Phase Period>

When the P-phase period id finished, a voltage corresponding to the amount of light received by the photodiode PD is measured. The period in which the voltage corresponding to the amount of light received by the photodiode PD is measured is hereinafter referred to as a "D-phase period". In a broad sense, the D-phase period is constituted by a period in which the charge generated by the photodiode PD is transferred to the floating diffusion FD and a period subsequent to the transfer period, and corresponds to the period of t3 to t4 illustrated in FIG. 4. In a narrow sense, however, the D-phase period may be set to a period obtained by excluding a margin period for the DAC stabilization and the data transfer from the period of t3 to t4.

In the D-phase period, since the reset pulse is not applied to the pixel to be processed, the reset transistor TR2 is in the off state, as in the P-phase period. That is, the above-described first-level potential barrier is formed between the constant-voltage source VDD and the floating diffusion FD, as illustrated in FIG. 5D, and the upper limit of the charge accumulated in the floating diffusion FD is defined by the first-level potential barrier.

Accordingly, no charge flows from the floating diffusion FD to the constant-voltage source VDD beyond the reset transistor TR2.

In the D-phase period, the transfer pulse (the transfer-on signal) is applied to the pixel to be processed. Thus, the transfer transistor TR1 is turned on, so that the potential barrier formed between the photodiode PD and the floating diffusion FD in the P-phase period disappears as illustrated in FIG. 5D. As a result, the charge generated according to the amount of light received by the photodiode PD flows into the floating diffusion FD.

In the D-phase period, since the selection pulse (the selection-on signal) is applied to the pixel to be processed, subsequently to the reset period, the selection transistor TR4 is in the on state. That is, as illustrated in FIG. 5D, the VSL voltage becomes a voltage obtained by amplifying the voltage of the floating diffusion FD, the amplification being performed by the amplification transistor TR3. That is, the vertical signal line VSL assumes a voltage corresponding to the amount of light received by the photodiode PD.

The range in which the reference voltage used during measurement of the pixel voltage in the D-phase period is varied is set to be sufficiently large, as illustrated in FIG. 4. The lower limit of the range in which the reference voltage can be varied is hereinafter referred to as a "saturation level in the system". When the ordinary light is incident, the saturation level in the system does not fall below the lower limit that can be assumed by the vertical signal line VSL, so that a second phase of the correlated double sampling can be properly performed.

Since the pixel PXL and the ADC circuit 71 are controlled as described above, the VSL voltage does not decrease to the lower limit of the voltage of the vertical signal line VSL, does not fall below the saturation level in the system, and crosses the reference signal when the counter 74 counts up to "1000".

(2-2) CDS Operation when Excessive Light is Incident

Figure 6:
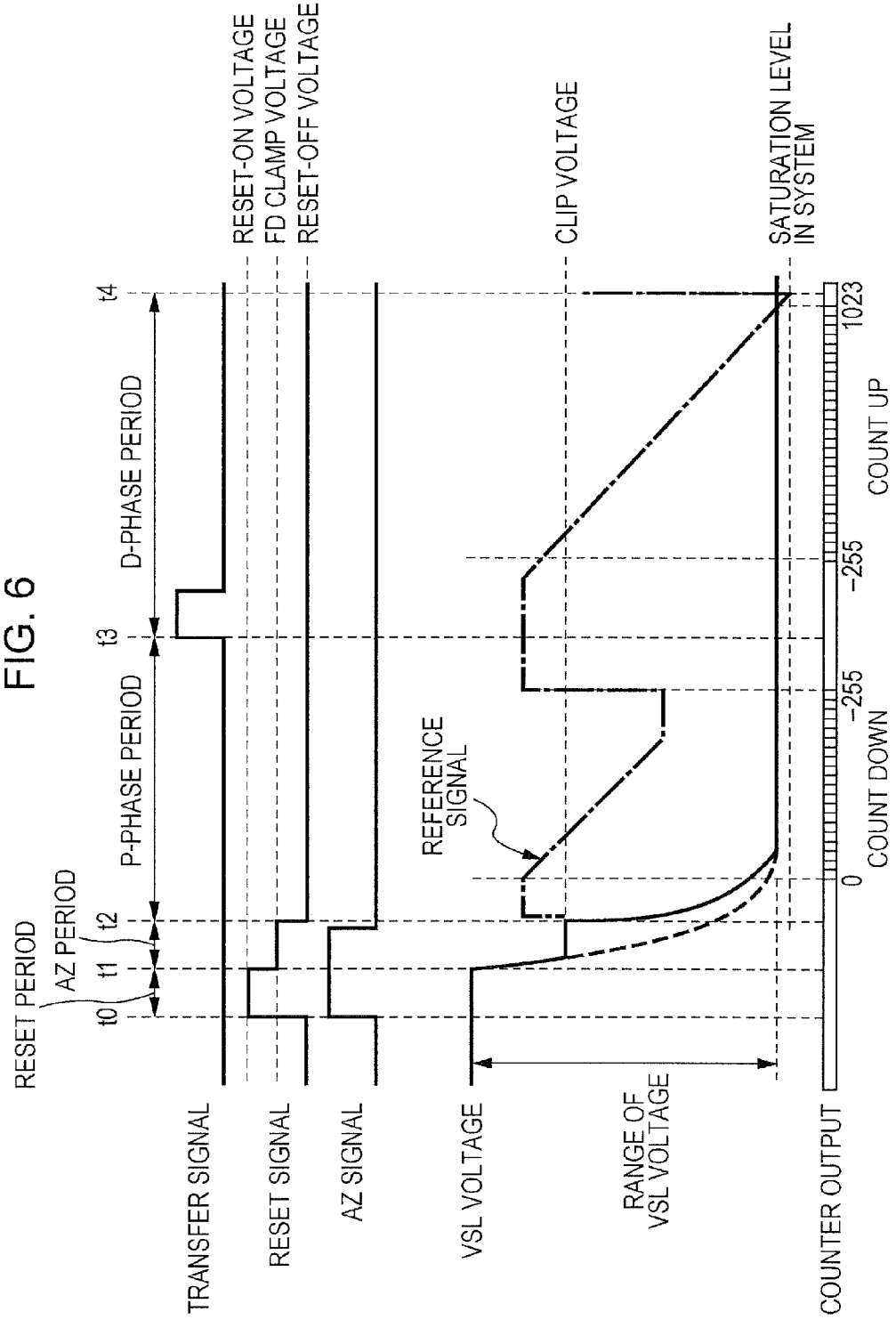
FIG. 6 is a diagram illustrating a sequence of the signal lines during reading from a pixel when excessive light is incident.

Next, a first example of the operation of the solid-state image capture device 100 when the excessive light is incident will be described with reference to FIGS. 6 and 7. FIG. 6 illustrates a sequence of the signal lines during reading from a pixel when the ordinary light is incident and FIGS. 7A to 7D illustrate potentials of the pixel at timings illustrated in FIG. 6. The operations of the pixel and the ADC circuit 71 in each period are basically the same as those in the above-described case in which the ordinary light is incident, and a detailed description of the same operations as those in the case in which the ordinary light is incident is not given hereinafter.

<Reset Period>

In the reset period, the reset transistor TR2 is reset by the reset-on voltage, as in the above-described case in which the ordinary light is incident. In this case, the first-level potential barrier is formed between the constant-voltage source VDD and the floating diffusion FD. In the reset period, the AZ operation is also executed (see FIG. 6).

<AZ Period>

In the AZ period, the reset pulse corresponding to the above-described FD clamp voltage is applied to the reset transistor TR2, so that the reset transistor TR2 is in the half-on state. At this point, the potential barrier formed between the constant-voltage source VDD and the floating diffusion FD changes to the second level (see FIGS. 6 and 7B).

In this case, the blooming induced by the excessive light causes charge to be accumulated in the floating diffusion FD, as illustrated in FIG. 7B. The amplification transistor TR3 amplifies a voltage corresponding to the accumulated charge and outputs the amplified voltage to the vertical signal line VSL. Thus, as illustrated in FIG. 6, the VSL voltage decreases greatly, compared to the voltage in the reset period.

As described above, however, the potential barrier formed by the reset transistor TR2 is adjusted to the second level that is lower than the first level and the voltage of the floating diffusion FD is clamped to the FD clamp voltage or lower. Thus, the VSL voltage is also clamped to the clip voltage or higher.

In the example illustrated in FIG. 6, since the total amount of charge that is caused to flow into the floating diffusion FD by the blooming also reaches a level exceeding the second-level potential barrier, the VSL voltage is clamped to the clip voltage in the AZ period.

<P-Phase Period>

In the P-phase period, the reset transistor TR2 is in the off state. The charge due to the blooming induced by the excessive light is accumulated in the floating diffusion FD, as illustrated in FIG. 7C. However, the potential barrier formed by the reset transistor TR2 increases to a higher level than the second level in the AZ period and changes to the first level.

Thus, as illustrated in FIG. 6, when the operation changes from the AZ period to the P-phase period, the VSL voltage gradually decreases exponentially from an initial value at the clip voltage at the rate of decrease corresponding to the VSL clamp voltage accumulated in the floating diffusion FD.

For example, when a maximum level of charge is accumulated in the floating diffusion FD, the VSL voltage decreases sharply as illustrated in FIG. 6. Thus, the reference signal and the VSL voltage do not cross each other, and in a first phase of the correlated double sampling, the pixel signal is not sampled and the counter 74 counts to a full count.

In such a case, the correlated double sampling does not work. Thus, when the counter 74 counts to the full count in the P-phase period, processing for forcibly determining that the pixel has a white signal is performed. This arrangement makes it possible to appropriately deal with the black sun effect.

<D-Phase Period>

In the D-phase period, the reset transistor TR2 is in the off state, as in the case in the P-phase period. The transfer transistor TR1 is in the on state, since the transfer pulse (the transfer-on signal) is applied thereto. Thus, the charge generated according to the amount of light received by the photodiode PD flows into the floating diffusion FD.

That is, the charge due to blooming induced by the excessive light and the charge generated according to the amount of light received by the photodiode PD are accumulated in the floating diffusion FD, as illustrated in FIG. 7D. The potential barrier formed by the reset transistor TR2 is at the first level that is higher than the second level.

For example, when a maximum level of charge is accumulated in the floating diffusion FD, the rate of decrease in the VSL voltage is high as illustrated in FIG. 6. Thus, when the operation changes from the P-phase period to the D-phase period, the VSL voltage reaches the lower limit that can be assumed by the vertical signal line VSL.

Thus, there is a possibility that the reference voltage and the VSL voltage cross each other in the vicinity of a full count of the counter 74, as illustrated in FIG. 6. In this case, although the crossing occurs in the vicinity of the full count, the count value does not correspond to the actual amount of received light since the charge accumulated in the floating diffusion FD is, in practice, saturated to flow out thereof.

In such a case, performing the processing for forcibly determining that the pixel has a white signal when the counter 74 counts to the full count in the above-described P-phase period makes it possible to appropriately deal with the black sun effect.

In addition, there are also cases in which the reference signal and the VSL voltage do not cross each other depending on the relationship between the lower limit that can be assumed by the vertical signal line VSL and the saturation level in the system. In such cases, the pixel signal is not sampled in a second phase of the correlated double sampling, so that the counter 74 counts to the full count.

In such cases, needless to say, the correlated double sampling does not work. Thus, when the counter 74 counts to the full count in the D-phase period, the processing for forcibly determining that the pixel has a white signal is performed. This arrangement makes it possible to appropriately deal with the black sun effect. As described above, the solid-state image capture device according to the present embodiment that uses the reset voltage having the three values can appropriately avoid an adverse effect due to the black sun effect.

(2-3) CDS Operation when Intermediate Light is Incident

Next, a first example of the operation of the solid-state image capture device 100 when the intermediate light is incident will be described with reference to FIGS. 8 and 9A to 9D. FIG. 8 illustrates a sequence of the signal lines during reading from a pixel when the intermediate light is incident and FIGS. 9A to 9D illustrate potentials of the pixel at timings illustrated in FIG. 8. The operations of the pixel and the ADC circuit 71 in each period are basically the same as those in the above-described case in which the ordinary light is incident, and a detailed description of the same operations as those in the case in which the ordinary light is incident is not given hereinafter.

<Reset Period>

In the reset period, the reset transistor TR2 is reset by the reset-on voltage, as in the above-described case in which the ordinary light is incident. In this case, the first-level potential barrier is formed between the constant-voltage source VDD and the floating diffusion FD. In the reset period, the AZ operation is also executed (see FIG. 9A).

<AZ Period>

In the AZ period, the reset pulse corresponding to the above-described FD clamp voltage is applied to the reset transistor TR2, so that the reset transistor TR2 is in the half-on state described above. At this point, the potential barrier formed between the constant-voltage source VDD and the floating diffusion FD changes to the second level.

At this point, owing to the blooming induced by the intermediate light, a small amount of charge is accumulated in the floating diffusion FD, as illustrated in FIG. 9B. However, since the intermediate light is weaker than the excessive light, charge up to only a level that does not reach the potential barrier formed by the reset transistor TR2 is accumulated in the floating diffusion FD.

Thus, as illustrated in FIG. 8, although the VSL voltage decreases exponentially in the AZ period, it does not drop to the clip voltage in the AZ period and gradually decreases throughout the entire subsequent P-phase period.

<P-Phase Period>

In the P-phase period, the reset transistor TR2 is in the off state. Charge due to blooming induced by the intermediate light is gradually accumulated in the floating diffusion FD, as illustrated in FIG. 9C.

In this case, in the P-phase period, the potential barrier of the reset transistor TR2 is at the first level that is higher than the second level in the above-described AZ period, so that the potential of the charge accumulated by the blooming continues to gradually increase even after exceeding the second level.

In this case, if the VSL voltage and the reference voltage do not cross each other, the black sun effect can be dealt with by the CDS operation for the above-described case in which the excessive light is incident. However, as illustrated in FIG. 8, the VSL voltage and the reference voltage are deemed to cross each other in the vicinity of the full count of the counter 74, depending on the situation of the VSL voltage drop.

In such a case, when the correlated double sampling works and the VSL voltage and the reference voltage cross each other in the D-phase period, the black sun effect is not appropriately dealt with, as described below.

<D-Phase Period>

In the D-phase period, the reset transistor TR2 is in the off state as in the P-phase period, whereas the transfer transistor TR1 is in the on state. Thus, the charge generated according to the amount of light received by the photodiode PD flows into the floating diffusion FD.

That is, the charge due to blooming induced by the excessive light and the charge generated according to the amount of light received by the photodiode PD are accumulated in the floating diffusion FD within a range in which the charges do not exceed the first-level potential barrier, as illustrated in FIG. 9D.

When the intermediate light is incident, the amount of charge due to the blooming is small and the amount of charge that the photodiode PD generates according to the amount of light received thereby is also small, compared to the case in which the excessive light is incident. Thus, the charge accumulated in the floating diffusion FD does not reach the level that exceeds the first-level potential barrier and the rate of decrease in the VSL voltage is low as illustrated in FIG. 8.

In such a case, the saturation level in the system is highly likely to fall below the lower limit that can be assumed by the vertical signal line VSL, as illustrated in FIG. 8, so that the VSL voltage is compared with the reference signal in a state in which the VSL voltage is clipped to the lower limit thereof.

That is, as illustrated in FIG. 8, there is a possibility that the reference voltage and the VSL voltage cross each other in the vicinity of the full count of the counter 74. In this case, although the crossing occurs in the vicinity of the full count, this count value does not correspond to the actual amount of received light since the VSL voltage is saturated in practice.

Since the counter 74 performs counting in both of the P-phase period and the D-phase period when the intermediate light is incident, as described above, there is a possibility that the correlated double sampling works. Thus, even when the pixel is a white pixel in practice, it may be recognized as a gray pixel.

In the example illustrated in FIG. 8, since the counter 74 counts to "−200" in the P-phase period, the count in the D-phase period is "700", which is significantly smaller count value than "1023" indicating a white pixel. In such a case, since the black sun effect is not dealt with by the CDS operation according to the first example, it is preferable to use a CDS operation according to a second example described below.

(3) SECOND EXAMPLE OF OPERATION OF SOLID-STATE IMAGE CAPTURE DEVICE (3-1) CDS Operation when Ordinary Light is Incident Next, a second example of the operation of the solid-state image capture device 100 when the ordinary light is incident will be described with reference to FIGS. 10 and 11A to 11D.

FIG. 10 illustrates a sequence of the signal lines during reading from a pixel when the ordinary light is incident and FIGS. 11A to 11D illustrate potentials of the pixel at timings illustrated in FIG. 10. Basic control for the pixel PXL and the ADC circuit 71 in the second example is the same as or similar to that in the first example described above, a detailed description thereof is not given hereinafter.

<Reset Period>

In the reset period, the reset transistor TR2 is reset by the reset-on voltage, as in the first example described above. At this point, the first-level potential barrier is formed between the constant-voltage source VDD and the floating diffusion FD. In the reset period, the AZ operation is also executed (see FIG. 11A).

<AZ Period>

In the AZ period, the reset pulse corresponding to the above-described FD clamp voltage is applied to the reset transistor TR2, so that the reset transistor TR2 is in the half-on state. At this point, the potential barrier formed between the constant-voltage source VDD and the floating diffusion FD changes to the second level (see FIG. 11B).

<P-Phase Period>

In the P-phase period, the reset transistor TR2 is in the off state. In this case, since the ordinary light is incident, no blooming noise is generated and thus almost no charge is accumulated in the floating diffusion FD, as illustrated in FIG. 11C.

In the second example, however, since the period in which the FD clamp voltage is applied is longer than the corresponding period in the first example described above, the FD clamp voltage is set considering not only blooming noise having a level to be removed by the CDS when the black sun effect does not occur but also the range in which the VSL voltage is varied by variations in transistor parameters.

The term "transistor parameters" refer to the capacitance of the floating diffusion, threshold voltages of the gates of the amplification transistor and a load MOS, a drain-source current supplied from the constant-current source to the transistors, and so on.

Accordingly, empirically considering blooming noise having a level to be removed by the CDS when the black sun effect does not occur and variations in the transistor parameters, the FD clamp voltage that defines the VSL clamp voltage is set at a level at which the range in which the voltage of the floating diffusion FD can be varied by those factors is covered.

The example illustrates in FIG. 10 corresponds to a case when the ordinary light is incident on the solid-state image capture device 100, and in this case, noise induced by a factor other than a sunspot causes the charge to flow into the floating diffusion FD, but the black sun effect does not occur. Thus, without dropping to the clip voltage, the VSL voltage crosses the reference signal when the counter 74 counts down at "−100".

<D-Phase Period>

In the D-phase period, the reset transistor TR2 is in the off state as in the P-phase period, the selection transistor TR4 is in the on state, and the transfer transistor TR1 is in the on state.

Thus, the charge generated according to the amount of light received by the photodiode PD flows into the floating diffusion FD. The VSL voltage also becomes a voltage obtained by amplifying the voltage of the floating diffusion FD, the amplification being performed by the amplification transistor TR3. That is, the vertical signal line VSL assumes a voltage corresponding to the amount of light received by the photodiode PD.

Since the example illustrated in FIG. 10 corresponds to the case in which the ordinary light is incident on the billing system 100 and no black sun effect occurs, the VSL voltage does not decrease to the lower limit of the voltage of the vertical signal line VSL, does not fall below the saturation level in the system, and crosses the reference signal when the counter 74 counts up to "1000".

(3-2) CDS Operation when Excessive Light is Incident

Next, a second example of the operation of the solid-state image capture device 100 when the excessive light is incident will be described with reference to FIGS. 12 and 13A to 13D. FIG. 12 illustrates a sequence of the signal lines during reading from a pixel when the excessive light is incident and FIGS. 13A to 13D illustrate potentials of the pixel at timings illustrated in FIG. 12. The operations of the pixel and the ADC circuit 71 in each period are basically the same as those in the above-described case in which the ordinary light is incident, and a detailed description of the same operations as those in the case in which the ordinary light is incident is not given hereinafter.

<Reset Period>

In the reset period, the reset transistor TR2 is reset by the reset-on voltage, as in the above-described case in which the ordinary light is incident. At this point, the first-level potential barrier is formed between the constant-voltage source VDD and the floating diffusion FD. In the reset period, the AZ operation is also executed.

<AZ Period>

In the AZ period, the reset pulse corresponding to the above-described FD clamp voltage is applied to the reset transistor TR2, so that the reset transistor TR2 is in the half-on state. At this point, the potential barrier formed between the constant-voltage source VDD and the floating diffusion FD changes to the second level.

In this case, the blooming induced by the excessive light causes charge to be accumulated in the floating diffusion FD, as illustrated in FIG. 13B. The amplification transistor TR3 amplifies a voltage corresponding to the accumulated charge and outputs the amplified voltage to the vertical signal line VSL. Thus, as illustrated in FIG. 12, the voltage of the vertical signal line VSL decreases greatly, compared to the voltage in the reset period.

As described above, however, the potential barrier formed by the reset transistor TR2 is adjusted to the second level that is lower than the first level and the voltage of the floating diffusion FD is clamped to the FD clamp voltage or lower. Thus, the VSL voltage is also clamped to the clip voltage or higher.

In the example illustrated in FIG. 12, since the total amount of charge that is caused to flow into the floating diffusion FD by the blooming also reaches a level exceeding the second-level potential barrier, the VSL voltage is clamped to the clip voltage in the AZ period.

<P-Phase Period>

In the P-phase period, the reset transistor TR2 is in the half-on state. Thus, the upper limit of the charge accumulated in the floating diffusion FD is defined by the above-described second-level potential barrier.

In the example illustrated in FIGS. 12 and 13A to 13D, blooming due to the excessive light occurs, and at the stage in the AZ period, the voltage of the floating diffusion FD is already clamped to the FD clamp voltage or lower and the VSL voltage is also clamped to the clip voltage or higher.

Thus, in the P-phase period, even when the blooming due to the excessive light further causes the charge to flow into the floating diffusion FD, the voltage of the floating diffusion FD is continuously clamped to the FD clamp voltage and the VSL voltage is continuously clamped to the clip voltage or higher. That is, as illustrated in FIG. 12, even when the excessive light is incident during the CDS operation according to the second example, the VSL voltage decreases to, at a minimum, only the clip voltage in the P-phase period.

Thus, in the example illustrated in FIG. 12, in a first phase of the correlated double sampling, the VSL voltage crosses the reference voltage when the counter 74 counts down to "−100".

<D-Phase Period>

In the D-phase period, the reset transistor TR2 is in the off state, since the reset pulse is not applied thereto. Thus, the upper limit of the charge accumulated in the floating diffusion FD is defined by the above-described first-level potential barrier. That is, in the D-phase period, the potential barrier formed by the reset transistor TR2 is high and the maximum value of the charge that can be accumulated in the floating diffusion FD increases, compared to the P-phase period.

In the example illustrated in FIGS. 12 and 13A to 13D, the blooming due to the excessive light occurs and the charge generated by the blooming begins to be accumulated in the floating diffusion FD again at a point when the operation changes from the P-phase period to the D-phase period (i.e., when the reset voltage changes from the FD clamp voltage to the reset-off voltage).

Thus, the voltage of the floating diffusion FD gradually decreases from the FD clamp voltage, and correspondingly, the voltage of the vertical signal line VSL also gradually decreases exponentially from the clip voltage.

The clip voltage, however, is determined so that the saturation level in the system is ensured between the VSL voltage in the P-phase period and the VSL voltage in the D-phase period.

Thus, as illustrated in FIG. 12, even when the VSL voltage reaches the lower-limit level in the D-phase period, the counter 74 can reliably count to the full count "1023". Thus, when the excessive light is incident, a white signal can be reliably output through the correlated double sampling.

(3-3) CDS Operation when Intermediate Light is Incident

Next, a second example of the operation of the solid-state image capture device 100 when the intermediate light is incident will be described with reference to FIGS. 14 and 15A to 15D. FIG. 14 illustrates a sequence of the signal lines during reading from a pixel when the intermediate light is incident and FIGS. 15A to 15D illustrate potentials of the pixel at timings illustrated in FIG. 14. The operations of the pixel and the ADC circuit 71 in each period are basically the same as those in the above-described case in which the ordinary light is incident, and a detailed description of the same operations as those in the case in which the ordinary light is incident is not given hereinafter.

<Reset Period>

In the reset period, the reset transistor TR2 is reset by the reset-on voltage, as in the above-described case in which the ordinary light is incident. At this point, the first-level potential barrier is formed between the constant-voltage source VDD and the floating diffusion FD. In the reset period, the AZ operation is also executed.

<AZ Period>

In the AZ period, the reset pulse corresponding to the above-described FD clamp voltage is applied to the reset transistor TR2, so that the reset transistor TR2 is in the half-on state described above. Thus, the upper limit of the charge accumulated in the floating diffusion FD is defined by the above-described second-level potential barrier.

In the example illustrated in FIGS. 14 and 15A to 15D, the blooming due to the intermediate light occurs to thereby cause charge to be accumulated in the floating diffusion FD. The amplification transistor TR3 amplifies a voltage corresponding to the accumulated charge and outputs the amplified voltage to the vertical signal line VSL, so that the voltage of the vertical signal line VSL gradually decreases.

Thus, charge up to only a level that does not reach the potential barrier formed by the reset transistor TR2 is accumulated in the floating diffusion FD, so that the VSL voltage does not decrease to the clip voltage in the AZ period.

<P-Phase Period>

In the P-phase period, the reset transistor TR2 is in the half-on state, as in the AZ period. Thus, the upper limit of the charge accumulated in the floating diffusion FD is defined by the above-described second-level potential barrier.

In the example illustrated in FIGS. 14 and 15A to 15D, blooming due to the intermediate light occurs, and at the stage in the AZ period, charge due to the blooming is gradually accumulated in the floating diffusion FD and the VSL voltage also decrease gradually.

In the P-phase period, further, the blooming due to the intermediate light causes the charge to flow into the floating diffusion FD, and as the amount of charge accumulated increases, the VSL voltage gradually decreases toward the clip voltage. Thereafter, in the example illustrated in FIG. 14, in the last half of the P-phase period, the voltage of the floating diffusion FD reaches the FD clamp voltage and the VSL voltage is clamped to the clip voltage.

That is, as illustrated in FIG. 14, even when the intermediate light is incident during the CDS operation according to the second example, the VSL voltage decreases to, at a minimum, only the clip voltage in the P-phase period. Thus, in a first phase of the correlated double sampling, the VSL voltage crosses the reference voltage when the counter 74 counts down to "−255".

<D-Phase Period>

In the D-phase period, the reset transistor TR2 is in the off state, since the reset pulse is not applied thereto. Thus, the upper limit of the charge accumulated in the floating diffusion FD is defined by the above-described first-level potential barrier.

In the example illustrated in FIGS. 14 and 15A to 15D, the blooming due to the intermediate light occurs and the charge generated by the blooming begins to be accumulated in the floating diffusion FD again at a point when the operation changes from the P-phase period to the D-phase period (i.e., when the reset voltage changes from the FD clamp voltage to the reset-off voltage).

Thus, the voltage of the floating diffusion FD gradually decreases from the FD clamp voltage, and correspondingly, the voltage of the vertical signal line VSL also gradually decreases exponentially from the clip voltage.

The clip voltage, however, is determined so that the saturation level in the system is ensured between the VSL voltage in the P-phase period and the VSL voltage in the D-phase period.

Thus, even when the VSL voltage reaches the lower-limit level in the D-phase period, the counter 74 can reliably count to the full count "1023", and in the example illustrated in FIG. 14, the VSL voltage crosses the reference signal when the counter 74 counts up to "1000". That is, even when the intermediate light is incident, a white signal can be reliably output through the correlated double sampling.

(4) MODIFICATIONS OF CONFIGURATION OF SOLID-STATE IMAGE CAPTURE DEVICE

In the CDS operation according to the second example described above, the potential level of the floating diffusion FD is affected by a coupling phenomenon due to variations in a parasitic capacitance present in the pixel (specifically, the floating diffusion FD) and a charge injection phenomenon due to the capacitance present between the gate of the reset transistor TR2 and the floating diffusion FD. Thus, there is a problem in that the black level is shifted. In a CDS operation of the related art, the potential level of the floating diffusion FD is not affected by those phenomena.

Figure 16A:
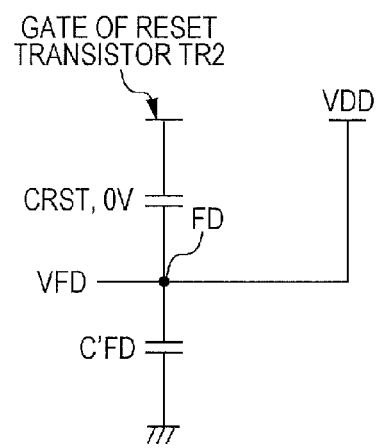
FIGS. 16A and 16B illustrate a coupling phenomenon and FIG. 16C illustrates a charge injection phenomenon.
Figure 16B:
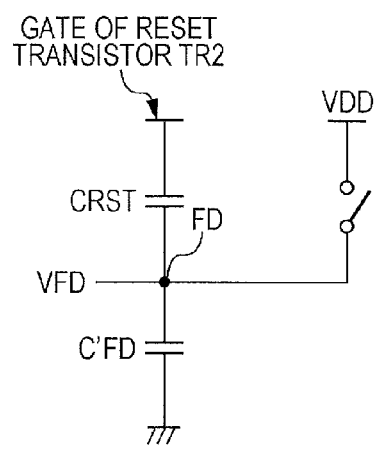
Figure 16C:
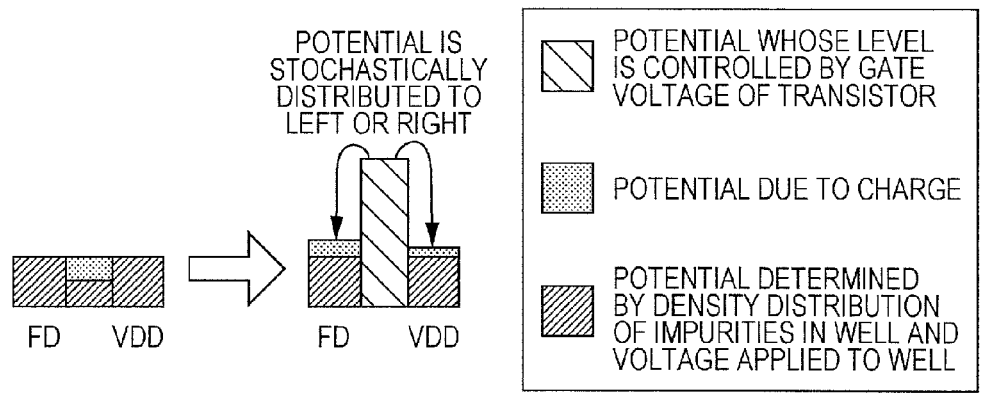

FIGS. 16A and 16B illustrate the coupling phenomenon and FIG. 16C illustrates the charge injection phenomenon. More specifically, FIG. 16A illustrates the coupling phenomenon when the operation is in the reset-on state and FIG. 16B illustrates the coupling phenomenon when the operation is in the reset-off state. In FIGS. 16A and 16B, CRST represents the capacitance formed between the gate of the reset transistor and the floating diffusion and C'FD represents the parasitic capacitance of the floating diffusion.

As illustrated in FIG. 16A, in the reset-on state, since the gate of the reset transistor TR2 and the floating diffusion FD are electrically connected to each other, no charge is accumulated in the capacitance CRST (0V), but charge is accumulated in the parasitic capacitance C'FD.

As illustrated in FIG. 16B, when the operation enters the reset-off state, the potential barrier is formed between the gate of the reset transistor TR2 and the floating diffusion FD and thus charge is accumulated in both of the capacitances CRST and C'FD. As a result, there is a possibility that the capacitances connected to the floating diffusion FD vary and the potential of the floating diffusion FD varies. This phenomenon is the aforementioned coupling phenomenon.

When the reset transistor TR2 changes from the on state to the off state, the potential barrier is formed and thus the charge below the gate is stochastically distributed to and raised toward the constant-voltage source VDD or the floating diffusion FD, as illustrated in FIG. 16C. That is, when the charge below the gate is raised toward the floating diffusion FD, there is a possibility that the potential of the floating diffusion FD varies. This phenomenon is the aforementioned charge injection phenomenon.

In the CDS operation according to the second example described above, the level of the potential barrier formed by the reset transistor TR2 changes when the P-phase period is finished and the operation changes to the D-phase period, so that an offset due to the coupling phenomenon and the charge injection phenomenon is superimposed on the floating diffusion FD. Consequently, fixed-pattern noise due to inter-pixel variations in the capacitance is superimposed on the digital signal that is eventually obtained.

Figure 17:
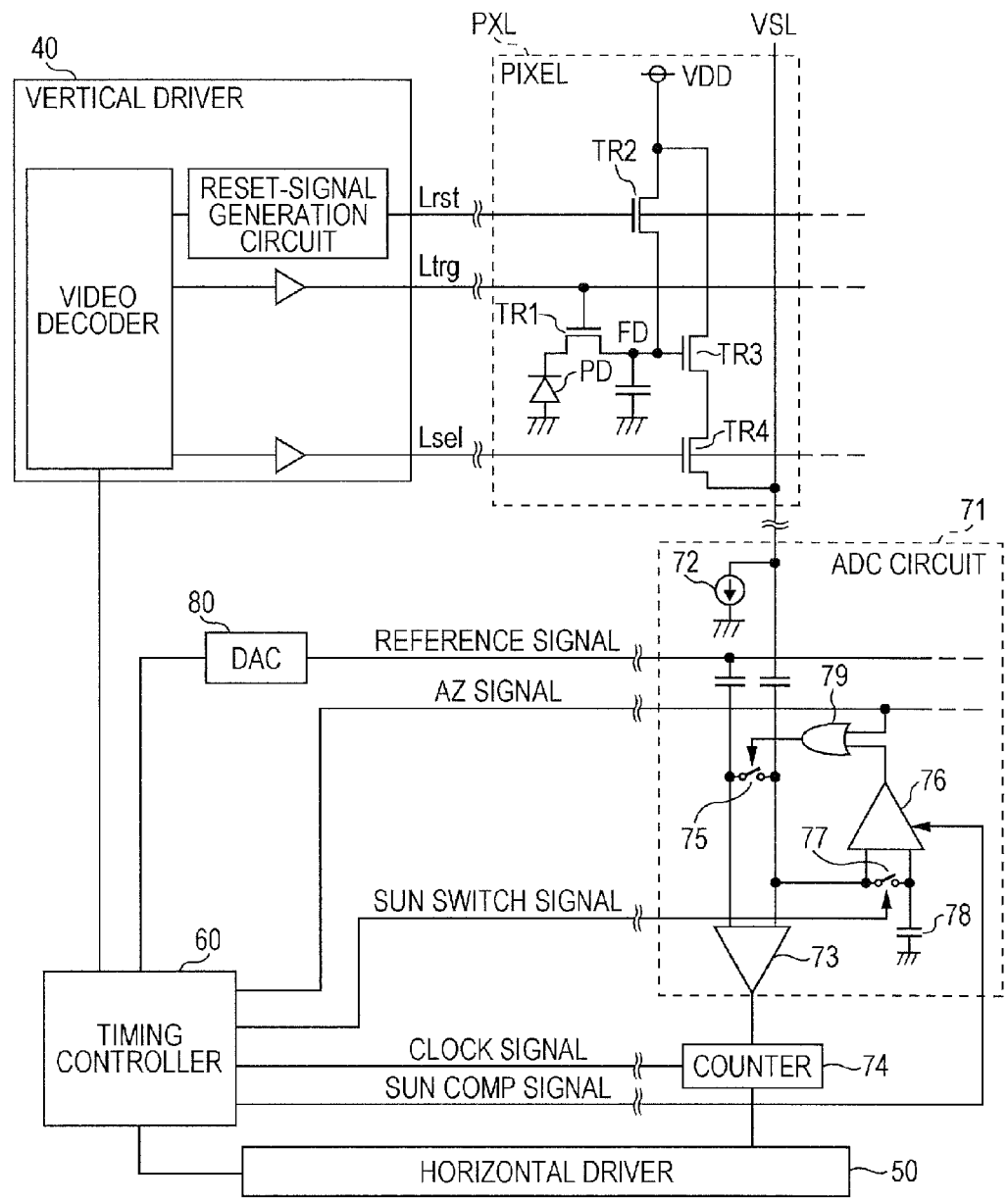
FIG. 17 is circuit diagram illustrating a major portion of the circuit configuration of a column processor and a pixel according to a third embodiment.

In a third example, a circuit configuration in which a circuit for sunspot determination is added to the circuit configuration of a column processor and a pixel is employed in order to avoid influences of those phenomena. FIG. 17 is circuit diagram illustrating a major portion of the circuit configuration of the column processor and the pixel according to the third example. The circuit configuration of the pixel illustrated in FIG. 17 and the configuration of a majority of portions of the column processor are the same as or similar to those illustrated in FIG. 2, and elements that are the same as or similar to those illustrated in FIG. 2 are denoted by the same reference numerals as those in FIG. 2 and descriptions thereof are not given hereinafter.

In FIG. 17, an ADC circuit 71 includes a comparator 76, a sun switch 77, a capacitor 78, and an OR circuit 79 in addition to the circuit configuration described above and illustrated in FIG. 2. The AZ switch 75 described above and illustrated in FIG. 2 is adapted to be switched according to an output of the OR circuit 79, not by the control of the timing controller 60.

The timing controller 60 is also adapted to output a sun switch signal for controlling the on/off of the sun switch 77 and a sun comp (sunspot comparison) signal for controlling the on/off of the operation of the comparator 76 in addition to the transfer signal, the reset signal, and the selection signal for driving the pixel and the AZ signal for indicating the AZ operation.

The sun switch 77 provides a connection between two input terminals of the comparator 76. The sun switch 77 is controlled so that it is turned on or off according to the sun switch signal output by the timing controller 60. When the sun switch 77 is turned on, the two input terminals of the comparator 76 are short-circuited to assume the same voltage, and when the sun switch 77 is turned off, voltages that are different from each other can be input to the two input terminals of the comparator 76.

One of the input terminals of the comparator 76 is connected to ground via the capacitor 78 and the other input terminal is connected to the vertical signal line VSL. That is, when the sun switch 77 is turned on and is then turned off after a predetermined amount of time, the capacitor 78 stores therein the voltage of the vertical signal line VSL at this point.

One input terminal of the OR circuit 79 is connected to an output terminal of the comparator 76 and another input terminal of the OR circuit 79 is connected to a line for transmitting the AZ signal output by the timing controller 60. That is, when one of the output of the comparator 76 and the AZ signal is on, the OR circuit 79 is adapted to output an on signal, and when neither the output of the comparator 76 nor the AZ signal is on, the OR circuit 79 is adapted to output an off signal.

As described above, in accordance with the output of the OR circuit 79, the AZ switch 75 is controlled so as to be turned on when the output of the OR circuit 79 is on and so as to be turned off when the output of the OR circuit 79 is off.

The above-described circuit (the comparator 76, the sun switch 77, the capacitor 78, and the OR circuit 79) added for the sunspot determination may be provided for each ADC circuit 71 or may be provided for the entire column processor 70. Needless to say, the ADC circuits 71 may be classified according to an arbitrary number of groups so that the ADC circuits 71 are provided for the respective groups.

When the circuit added for the sunspot determination is provided for each ADC circuit 71, the enabling/disabling of the correlated double sampling can be determined for each pixel. When the circuit is provided for the entire column processor 70 or for each group, the enabling/disabling of the correlated double sampling can be determined for only each row or for only each group but the area occupied by the column processor 70 and the cost can be reduced.

A description below will be given of a CDS operation (a third example of the operation) of the solid-state image capture device configured as illustrated in FIG. 17.

(5) THIRD EXAMPLE OF OPERATION OF SOLID-STATE IMAGE CAPTURE DEVICE (5-1) CDS Operation when Ordinary Light is Incident FIG. 18 illustrates a sequence of the signal lines during reading from a pixel when the ordinary light is incident and FIGS. 19A to 19E illustrate potentials of the pixel at timings illustrated in FIG. 18.

<Reset Period>

In a pixel reading operation, the reset transistor TR2 is first turned on for a predetermined amount of time (t0 to t1 in FIG. 18) to thereby sweep the charge accumulated in the floating diffusion FD. This period in which the charge is swept is hereinafter referred to as a "reset period".

More specifically, in the reset period, a reset pulse corresponding to the above-described reset-on voltage is applied to the pixel to be processed. In response, the reset transistor TR2 is turned on, so that the potential barrier that the reset transistor TR2 forms between the constant-voltage source VDD and the floating diffusion FD disappears. As a result, the floating diffusion FD is electrically connected to the constant-voltage source VDD and is reset to a predetermined level.

In the reset period, the selection pulse (the selection-on signal) is also applied to the pixel to be processed. In response, the amplification transistor TR3 and the selection transistor TR4 are turned on to thereby remove the potential barriers that the amplification transistor TR3 and the selection transistor TR4 form between the constant-voltage source VDD and the vertical signal line VSL. As a result, the vertical signal line VSL is electrically connected to the constant-voltage source VDD and is reset to a predetermined level.

In the reset period, the AZ signal is also turned on and the sun switch signal is turned off. At this point, since the OR circuit 79 outputs an on signal, the AZ switch 75 is turned on. That is, in the reset period, the AZ operation is also executed, and the potential difference between the pixel signal VSL and the reference signal VREF input to the comparator 73 is cancelled.

In the reset period, the transfer pulse (the transfer-on signal) is not applied to the pixel to be processed. Thus, the transfer transistor TR1 is turned off, so that the transfer transistor TR1 forms a potential barrier between the photodiode PD and the floating diffusion FD. That is, the charge generated according to the amount of light received by the photodiode PD does not flow into the floating diffusion FD.

However, when the reset transistor TR2 is turned on, the coupling phenomenon and the charge injection phenomenon occur and the voltage of the floating diffusion FD increases. Thus, the voltage of the vertical signal line VSL also increases. That is, when the state of the reset transistor TR2 changes from the off state to the on state, the voltage of the vertical signal line VSL also varies.

The difference between the voltage of the vertical signal line VSL, the voltage being reset as described above, and the voltage having the lower limit that can be assumed by the vertical signal line VSL corresponds to the range of the voltage that can be assumed by the vertical signal line VSL.

<AZ Period>

When the reset period is finished, the AZ operation for cancelling the potential difference between the two input terminals of the comparator 73 is executed. In the present embodiment, since the AZ operation is also executed in the reset period, as described above, the AZ operation is executed for a predetermined amount of time (t1 to t2 in FIG. 18) subsequently to the reset period.

As a result of the AZ operation, the potential difference between the pixel signal VSL and the reference signal VREF input to the comparator 73 is cancelled to thereby make it possible to accurately perform subsequent signal comparison processing. The predetermined amount of time (t1 to t2) in which the AZ operation is performed is hereinafter referred to as an "AZ period".

In the AZ period, the reset pulse corresponding to the above-described FD clamp voltage is applied to the pixel to be processed. Thus, the reset transistor TR2 enters the above-described half-on state, so that the second-level potential barrier is formed between the constant-voltage source VDD and the floating diffusion FD, as illustrated in FIG. 19B.

As a result, the upper limit of the charge accumulated in the floating diffusion FD is defined by the above-described second-level potential barrier. That is, charge that does not exceed the potential barrier is accumulated in the floating diffusion FD, but charge that exceeds the potential barrier flows out of the floating diffusion FD.

As a result, the voltage of the floating diffusion FD is clamped to a voltage that is higher than or equal to the voltage corresponding to the above-described second-level potential barrier. The clamped voltage is hereinafter referred to as a "VSL clamp voltage".

In the AZ period, the selection pulse (the selection-on signal) is applied to the pixel to be processed, subsequently to the reset period. Thus, the selection transistor TR4 is in the on state and the vertical signal line VSL is a voltage obtained by amplifying the voltage of the floating diffusion FD, the amplification being performed by the amplification transistor TR3. The voltage that appears at the vertical signal line VSL when the floating diffusion FD has the VSL clamp voltage is hereinafter referred to as a "clip voltage".

In the AZ-phase period, the transfer pulse (the transfer-on signal) is not applied to the pixel to be processed, subsequently to the reset period. Thus, the transfer transistor TR1 is turned off to thereby maintain the state in which the transfer transistor TR1 forms the potential barrier between the photodiode PD and the floating diffusion FD.

Thus, in the AZ period, the charge generated according to the amount of light received by the photodiode PD does not flow into the floating diffusion FD. It is, however, important that the pixel circuit be configured so that charge that is caused to flow into the floating diffusion FD by the blooming noise having a level that is to be removed by the CDS when the black sun effect does not occur can be accumulated.

Accordingly, the FD clamp voltage that defines the VSL clamp voltage is determined empirically considering the charge that is caused to flow into the floating diffusion FD by the blooming noise having a level to be removed by the CDS when the black sun phenomenon does not occur. The FD clamp voltage is set at a level at which the range in which the voltage of the floating diffusion FD can be varied by the blooming noise is covered.

That is, the charge generated in the floating diffusion FD by the noise does not reach the level that exceeds the above-described second-level potential barrier and the voltage of the floating diffusion FD does not reach a voltage that is lower than or equal to the VSL clamp voltage of the floating diffusion FD when the ordinary light is incident.

<P-Phase Period>

When the AZ period is finished, the voltage of the pixel that has been reset is measured. The period in which the voltage of the pixel that has been reset is measured is hereinafter referred to as a "P-phase period". In a broad sense, the P-phase period is a period before the charge generated by the photodiode PD is transferred to the floating diffusion FD, and corresponds to the period of t2 to t4 in FIG. 18.

In a narrow sense, however, the P-phase period may be set to a period obtained by excluding a margin period for the DAC stabilization and a sunspot determination period t3 to t4 (described below) from the period of t2 to t4. A description below is given of a case in which the period excluding the period of t3 to t4, which is a sun clip period described below, is the P-phase period.

In the P-phase period, the reset pulse corresponding to the above-described FD clamp voltage is applied to the pixel to be processed, subsequently to the AZ period. Thus, the reset transistor TR2 enters the above-described half-on state, so that the second-level potential barrier is formed between the constant-voltage source VDD and the floating diffusion FD.

As a result, the upper limit of the charge accumulated in the floating diffusion FD is defined by the above-described second-level potential barrier. That is, charge that does not exceed the potential barrier is accumulated in the floating diffusion FD, but charge that exceeds the potential barrier flows out of the floating diffusion FD.

As a result, in the P-phase period in addition to above-described AZ period, the voltage of the floating diffusion FD is also clamped to a voltage that is higher than or equal to the voltage corresponding to the above-described second-level potential barrier. That is, the VSL voltage is maintained at a voltage higher than or equal to the clip voltage.

Thus, even if the VSL voltage is clipped to the clip voltage, this clip state is continued during the P-phase period and thus the difference between the VSL voltage in the P-phase period and the VSL voltage in the D-phase period described below, i.e., the amount of light received by the photodiode PD, can be detected.

In the P-phase period, the transfer pulse (the transfer-on signal) is not applied to the pixel to be processed, subsequently to the reset period. Thus, the transfer transistor TR1 is turned off to thereby maintain the state in which the transfer transistor TR1 forms the potential barrier between the photodiode PD and the floating diffusion FD. As a result, the charge generated according to the amount of light received by the photodiode PD does not flow into the floating diffusion FD.

In the P-phase period, since the selection pulse (the selection-on signal) is applied to the pixel to be processed, subsequently to the reset period, the selection transistor TR4 is in the on state. That is, the VSL voltage becomes a voltage obtained by amplifying the voltage of the floating diffusion FD, the amplification being performed by the amplification transistor TR3.

The reference voltage used during measurement of the pixel voltage in the P-phase period is set so that the range in which the reference voltage varies includes a range in which the VSL voltage is varied by the noise. Thus, a first phase of the correlated double sampling can be properly performed except when the excessive light that may cause the black sun effect is incident.

In the example illustrates in FIG. 18, although noise induced by a factor other than a sunspot causes the charge to flow into the floating diffusion FD, the black sun effect does not occur. Thus, without dropping to the clip voltage, the VSL voltage crosses the reference signal when the counter 74 counts down at "–100".

<Sunspot Determination Period>

In the P-phase period, when the comparison of the reference voltage with the reference voltage VSL is finished, a determination is made as to whether or not a sunspot occurs in the period of t3 to t4 illustrated in FIG. 18. The period in which the determination is made is hereinafter referred to as a "sunspot determination period".

In the third example, the sunspot determination period is provided between the P-phase period and the D-phase period. However, the sunspot determination period may be performed at any period of time which is prior to the D-phase period and in which the pixel signal of the same pixel is read.

In the sunspot determination period, first, the VSL voltage when the P-phase period is finished is stored in the capacitor 78. More specifically, when the sun switch signal is turned on and then a predetermined period passes, the sun switch signal is turned off. The predetermined period is an amount of time that is sufficient for charge corresponding to the VSL voltage to be accumulated in the capacitor 78.

Next, the reset transistor TR2 apples, to the gate of the reset transistor TR2, the reset pulse that forms the potential barrier corresponding to the level of noise that can be generated in a normal state in which the excessive light is not incident. The potential barrier formed in this case may be set to have such a voltage that is not exceeded by variations that are caused to occur in the VSL voltage by the blooming noise and variations in the transistor parameters, for example, to have a voltage corresponding to the above-described FD clamp voltage.

In the state in which the potential barrier is formed by the reset transistor TR2 in the manner descried above, the comparator 76 is operated. That is, the sun comp signal to be input to the comparator 76 is turned on.

At this point, the VSL voltage when the reset-off voltage is applied to the gate of the reset transistor TR2 is applied to one of the terminals of the comparator 76 and the VSL voltage when the FD clamp voltage is applied to the gate of the reset transistor TR2 is applied to the other terminal of the comparator 76. That is, the comparator 76 compares the VSL voltages when the reset voltages that are different from each other are input to the reset transistor TR2.

When the potential difference between the two input terminals is not in an allowable range, the comparator 76 determines that the excessive light is received and performs the AZ operation. When the potential difference between the two input terminals is in the allowable range, the comparator 76 determines that the excessive light is not received and does not perform the AZ operation.

For example, the comparator 76 can be implemented by a comparator having hysteresis using a predetermined threshold range corresponding to the allowable range as a dead band. In this case, when the potential difference between the two input terminals is not in the allowable range, the comparator 76 outputs an on signal to the OR circuit 79 to turn on the AZ switch 75. When the potential difference between the two input terminals is in the allowable range, the comparator 76 outputs an off signal to the OR circuit 79 to turn off the AZ switch 75. In the example illustrated in FIG. 18, since the excessive light is not received, the AZ operation is not performed in the sunspot determination period.

In addition, the timing controller 60 monitors the result of the comparison of the comparator 76, and when the result of the determination shows that the potential difference between the two input terminals is not in the allowable range, the timing controller 60 controls the counter 74 to clear the count value counted in the P-phase period. On the other hand, when the result of the determination shows that the potential difference between the two input terminals is in the allowable range, the timing controller 60 causes the counter 74 to maintain the count value and to execute the correlated double sampling. In the example illustrated in FIG. 18, since the excessive light is not received, the count value of the counter 74 is not cleared.

<D-Phase Period>

When the P-phase period is finished, a voltage corresponding to the amount of light received by the photodiode PD is measured. The period in which the voltage corresponding to the amount of light received by the photodiode PD is measured is hereinafter referred to as a "D-phase period". In a broad sense, the D-phase period is constituted by a period in which the charge generated by the photodiode PD is transferred to the floating diffusion FD and a period subsequent to the transfer period, and corresponds to the period of t4 to t5 illustrated in FIG. 18. In a narrow sense, however, the D-phase period may be set to a period obtained by excluding a margin period for the DAC stabilization and the data transfer from the period of t4 to t5.

In the D-phase period, since the reset pulse is not applied to the pixel to be processed, the reset transistor TR2 is in the off state, as in the P-phase period. That is, the above-described first-level potential barrier is formed between the constant-voltage source VDD and the floating diffusion FD and the upper limit of the charge accumulated in the floating diffusion FD is defined by the first-level potential barrier.

Accordingly, no charge flows from the floating diffusion FD to the constant-voltage source VDD beyond the reset transistor TR2.

In the D-phase period, the transfer pulse (the transfer-on signal) is applied to the pixel to be processed. Thus, the transfer transistor TR1 is turned on, so that the potential barrier formed between the photodiode PD and the floating diffusion FD until the P-phase period disappears. As a result, the charge generated according to the amount of light received by the photodiode PD flows into the floating diffusion FD.

In the D-phase period, since the selection pulse (the selection-on signal) is applied to the pixel to be processed, subsequently to the reset period, the selection transistor TR4 is in the on state. That is, the VSL voltage becomes a voltage obtained by amplifying the voltage of the floating diffusion FD, the amplification being performed by the amplification transistor TR3. That is, the vertical signal line VSL assumes a voltage corresponding to the amount of light received by the photodiode PD.

The range in which the reference voltage used during measurement of the pixel voltage in the D-phase period is varied is set to be sufficiently large. The lower limit of the range in which the reference voltage can be varied is hereinafter referred to as a "saturation level in the system". When the ordinary light is incident, the saturation level in the system does not fall below the lower limit that can be assumed by the vertical signal line VSL, so that a second phase of the correlated double sampling can be properly performed.

Since the pixel PXL and the ADC circuit 71 are controlled as described above, the VSL voltage does not decrease to the lower limit of the voltage of the vertical signal line VSL, does not fall below the saturation level in the system, and crosses the reference signal when the counter 74 counts up to "800".

In the third example, if the amount of light received by the photodiode PD becomes excessive, the correlated double sampling is disabled to thereby make it possible to effectively avoid the influence of the blooming. In the third example, since the potential barrier formed by the reset transistor TR2 in the P-phase period and the potential barrier formed by the reset transistor TR2 in the D-phase period are at the same first level, it is possible to avoid the influences of the above-described coupling phenomenon and charge injection phenomenon.

(5-2) CDS Operation when Excessive Light is Incident

Next, a third example of the operation of the solid-state image capture device 100 when the excessive light is incident will be described with reference to FIGS. 20 and 21A to 21E. FIG. 20 illustrates a sequence of the signal lines during reading from a pixel when the excessive light is incident and FIGS. 21A to 21E illustrate potentials of the pixel at timings illustrated in FIG. 20. The operations of the pixel and the ADC circuit 71 in each period are basically the same as those in the above-described case in which the ordinary light is incident, and a detailed description of the same operations as those in the case in which the ordinary light is incident is not given hereinafter.

<Reset Period>

In the reset period, the reset transistor TR2 is reset by the reset-on voltage, as in the above-described case in which the ordinary light is incident. At this point, when the reset transistor TR2 is turned on, the coupling phenomenon and the charge injection phenomenon occur, the voltage of the floating diffusion FD increases as illustrated in FIG. 21A, and the VSL voltage also increases as illustrated in FIG. 20. In the reset period, the AZ operation is also executed.

<AZ Period>

In the AZ period, the reset pulse corresponding to the above-described FD clamp voltage is applied to the reset transistor TR2, so that the reset transistor TR2 is in the half-on state.

At this point, owing to the blooming induced by the excessive light, charge is accumulated in the floating diffusion FD, as illustrated in FIG. 21B. The amplification transistor TR3 amplifies a voltage corresponding to the accumulated charge and outputs the amplified voltage to the vertical signal line VSL, so that the voltage of the vertical signal line VSL decreases greatly compared to the voltage in the reset period.

As described above, however, the potential barrier formed by the reset transistor TR2 is adjusted to the second level that is lower than the first level, so that the voltage of the floating diffusion FD is clipped to the FD clamp voltage or lower and the VSL voltage is also clipped to the clip voltage or higher.

<P-Phase Period>

In the P-phase period, the reset transistor TR2 is in the off state, since the reset pulse is not applied thereto. The upper limit of the charge accumulated in the floating diffusion FD is defined by the first-level potential barrier.

In the P-phase period, the blooming induced by the excessive light causes charge to be accumulated in the floating diffusion FD, as illustrated in FIG. 21C. In this case, in the P-phase period, since the potential barrier of the reset transistor TR2 is higher than that in the above-described AZ period, the potential of the charge accumulated by the blooming continues to increase even after exceeding the second level.

For example, when a maximum level of charge is accumulated in the floating diffusion FD, the rate of decrease in the VSL voltage is high as illustrated in FIG. 20. Thus, the reference signal and the VSL voltage do not cross each other, and in a first phase of the correlated double sampling, the pixel signal is not sampled and the counter 74 counts to the fully count.

In such cases, the correlated double sampling does not work. Accordingly, when the counter 74 counts to the full count in the P-phase period, the processing for forcibly determining that the pixel has a white signal is performed to thereby allow the solid-state image capture device according to the present embodiment to appropriately deal with the black sun effect.

<Sunspot Determination Period>

Since the excessive light is received in the example illustrated in FIG. 20, the AZ operation and discarding of the count value of the counter 74 are performed in the sunspot determination period.

More specifically, the comparator 76 performs a comparison operation and outputs a resulting on signal to the OR circuit 79. In response, the OR circuit 79 outputs an on signal to the AZ switch 75 to perform an AZ operation for turning on the AZ switch 75. Under the control of the timing controller 60, the count value of the counter 74 is also reset.

As described above, when information resulting from the correlated double sampling is discarded, the counter 74 resumes counting at a value corresponding to the black level in the D-phase period. Thus, it is possible to output the pixel signal as a white signal without counting to the full count in the D-phase period.

<D-Phase Period>

In the D-phase period, the reset transistor TR2 is in the off state, since the reset pulse is not applied thereto. Thus, the upper limit of the charge accumulated in the floating diffusion FD is defined by the above-described first-level potential barrier. That is, in the D-phase period, the potential barrier formed by the reset transistor TR2 is high and the maximum value of the charge that can be accumulated in the floating diffusion FD increases, compared to the sunspot determination period.

In the example illustrated in FIGS. 20 and 21A to 21E, blooming due to the excessive light occurs and the charge generated by the blooming begins to be accumulated in the floating diffusion FD again at a point when the operation changes from the sunspot determination period to the D-phase period (i.e., when the reset voltage changes from the FD clamp voltage to the reset-off voltage).

Thus, the voltage of the floating diffusion FD gradually decreases from the FD clamp voltage, and correspondingly, the voltage of the vertical signal line VSL also gradually decreases exponentially from the clip voltage.

However, the clip voltage used for the AZ operation in the sunspot determination period is determined so that the saturation level in the system is ensured between the VSL voltage reset in the sunspot determination period and the VSL voltage in the D-phase period. Thus, when the VSL voltage is a clip voltage at the time of start of the D-phase period and then the VSL voltage decreases to the lower limit, the counter 74 reliably counts to the full count.

In the example illustrated in FIG. 20, the counter 74 stops counting until the count value reaches "0" corresponding to the black level, then starts counting from "0", and counts up to the full count "1023". Thus, when the excessive light is incident, the correlated double sampling is turned off to thereby make it possible to reliably output a white signal.

(5-3) CDS Operation when Intermediate Light is Incident

Figure 22:
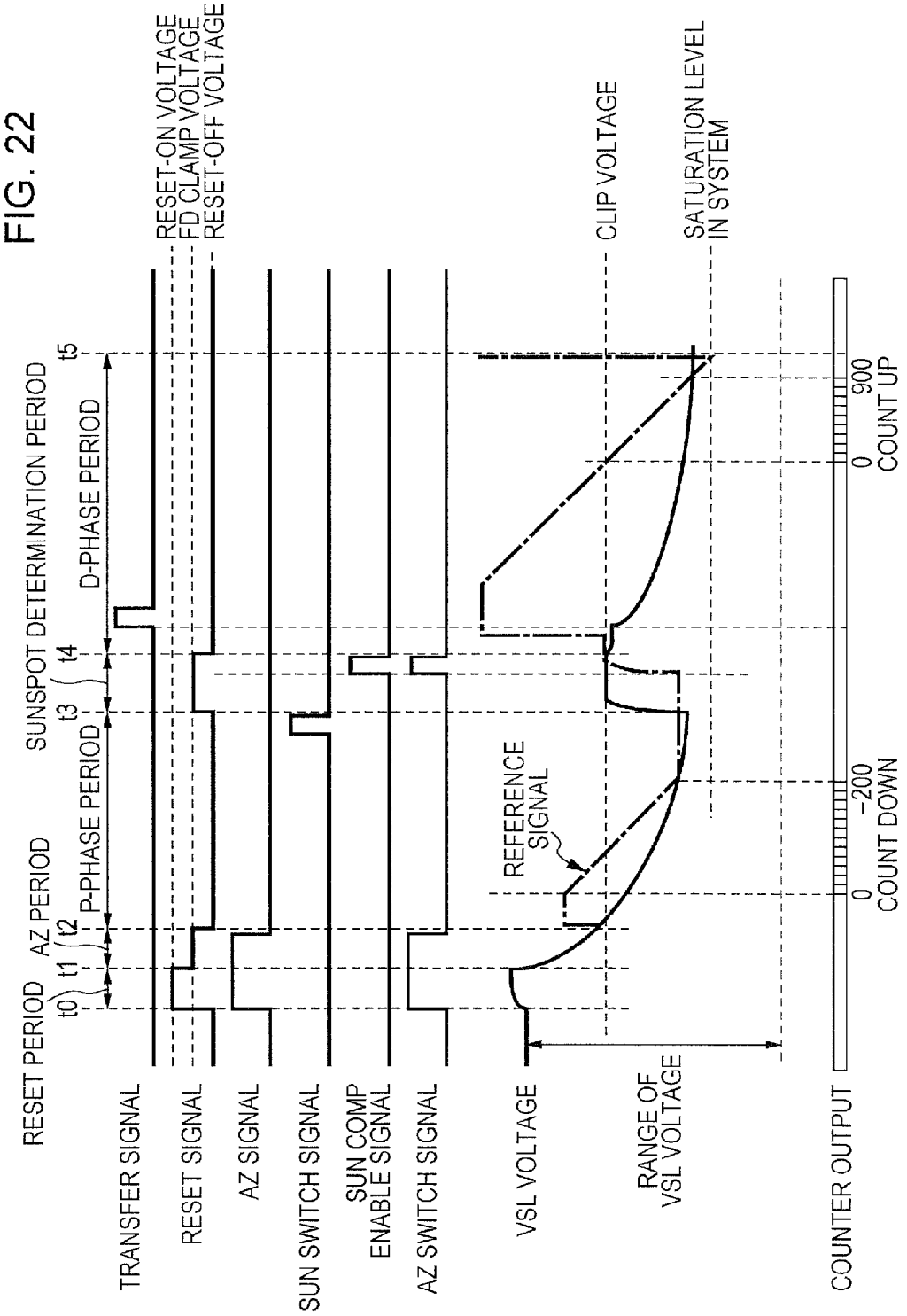
FIG. 22 is a diagram illustrating a sequence of the signal lines during reading from a pixel when the intermediate light is incident.

Next, a third example of the operation of the solid-state image capture device 100 when the intermediate light is incident will be described with reference to FIGS. 22 and 23A to 23E. FIG. 22 illustrates a sequence of the signal lines during reading from a pixel when the intermediate light is incident and FIGS. 23A to 23E illustrate potentials of the pixel at timings illustrated in FIG. 22. The operations of the pixel and the ADC circuit 71 in each period are basically the same as those in the above-described case in which the ordinary light is incident, and a detailed description of the same operations as those in the case in which the ordinary light is incident is not given hereinafter.

<Reset Period>

In the reset period, the reset transistor TR2 is reset by the reset-on voltage, as in the above-described case in which the ordinary light is incident. At this point, when the reset transistor TR2 is turned on, the coupling phenomenon and the charge injection phenomenon occur, the voltage of the floating diffusion FD increases as illustrated in FIG. 23A, and the VSL voltage also increases as illustrated in FIG. 22. In the reset period, the AZ operation is also executed.

<AZ Period>

In the AZ period, the reset pulse corresponding to the above-described FD clamp voltage is applied to the reset transistor TR2, so that the reset transistor TR2 is in the half-on state. At this point, the potential barrier formed between the constant-voltage source VDD and the floating diffusion FD changes to the second level.

In the example illustrated in FIGS. 22 and 23A to 23E, the blooming due to the intermediate light occurs to thereby cause charge to be accumulated in the floating diffusion FD. The amplification transistor TR3 amplifies a voltage corresponding to the accumulated charge and outputs the amplified voltage to the vertical signal line VSL, so that the voltage of the vertical signal line VSL gradually decreases.

Thus, charge up to only a level that does not reach the potential barrier formed by the reset transistor TR2 is accumulated in the floating diffusion FD, so that the VSL voltage does not decrease to the clip voltage in the AZ period.

<P-Phase Period>

In the P-phase period, the reset transistor TR2 is in the off state, since the reset pulse is not applied thereto. The upper limit of the charge accumulated in the floating diffusion FD is defined by the first-level potential barrier.

In the example illustrated in FIGS. 22 and 23A to 23E, blooming due to the intermediate light occurs, and at the stage in the AZ period, charge due to the blooming is gradually accumulated in the floating diffusion FD and the VSL voltage also decrease gradually.

In the P-phase period, further, the blooming due to the intermediate light causes the charge to flow into the floating diffusion FD, and as the amount of charge accumulated increases, the VSL voltage gradually decreases toward the clip voltage.

In this case, when the vertical signal line VSL and the reference voltage do not cross each other, the black sun effect can be dealt with by the above-described CDS operation performed when the excessive light is incident. However, as illustrated in FIG. 22, the vertical signal line VSL and the reference voltage may cross each other when the counter 74 counts to the vicinity of the full count of "−200", depending on the state of a drop in the VSL voltage.

<Sunspot Determination Period>

Thus, in the example illustrated in FIG. 22, since the intermediate light is received, there is a possibility that the intermediate light causes the black sun effect. Thus, it is determined that the above-described potential difference between the two input terminals is not in the allowable range and information resulting from the AZ operation and the correlated double sampling is discarded.

More specifically, the comparator 76 performs a comparison operation and outputs a resulting on signal to an OR circuit 79. In response, the OR circuit 79 outputs an on signal to the AZ switch 75 to perform an AZ operation for turning on the AZ switch 75. Under the control of the timing controller 60, the count value of the counter 74 is also reset.

As described above, when information resulting from the correlated double sampling is discarded, the counter 74 resumes counting at a value corresponding to the black level in the D-phase period. Thus, it is possible to output the pixel signal as a white signal without counting to the full count in the D-phase period.

<D-Phase Period>

In the D-phase period, the reset transistor TR2 is in the off state, since the reset pulse is not applied thereto. Thus, the upper limit of the charge accumulated in the floating diffusion FD is defined by the above-described first-level potential barrier.

In the example illustrated in FIGS. 22 and 23A to 23E, blooming due to the intermediate light occurs and the charge generated by the blooming begins to be accumulated in the floating diffusion FD again at a point when the operation changes from the sunspot determination period to the D-phase period (i.e., when the reset voltage changes from the FD clamp voltage to the reset-off voltage).

In the example illustrated in FIG. 22, the counter 74 stops counting until the count value reaches "0" corresponding to the black level, then starts counting from "0", and counts up to "900". Thus, when the intermediate light is incident, signals are output using the correlated double sampling, when possible. When there is a possibility that the black sun effect occurs, the correlated double sampling is turned off to allow outputting of an appropriate signal corresponding to the amount of light received by the photodiode PD.

(6) SUMMARY

According to the embodiment described above, in the period between the reset period and the P-phase period, the level of the reset signal applied to the reset transistor TR2 connected to the floating diffusion FD is set to the FD clamp voltage that is intermediate between the reset-on voltage and the reset-off voltage. This arrangement makes it possible to avoid a correlated-double-sampling failure due blooming that flows into the floating diffusion FD and also allows the ADC circuit to output an appropriate digital signal corresponding to the pixel signal.

The present technology may take the following configuration.

(1) A solid-state image capture device including:
a pixel including a photoelectric conversion element configured to convert light into signal charge and first to fourth switch elements;
a reference-signal generator configured to generate a reference signal that changes with time; and
an analog-to-digital converter configured to generate a digital signal corresponding to an analog signal output by the pixel, by using a comparator having a first input terminal connected to the pixel and a second input terminal connected to the reference-signal generator,
wherein the photoelectric conversion element is connected to a predetermined connection point via the first switch element,
the predetermined connection point is connected to a predetermined constant-voltage source via the second switch element and is connected to the first input terminal via the third switch element, and
the first input terminal and the second input terminal are connected via the fourth switch element; and
wherein, during acquirement of a digital signal corresponding to an amount of light received by the photoelectric conversion element,
the second switch element is turned on to reset a voltage of the predetermined connection point,
the fourth switch element is turned on while a connection degree of the second switch element is in an intermediate state between an on state and an off state to cause the first input terminal and the second input terminal to reach a same potential,
the second switch element is not turned on and the third switch element is turned on to cause the analog-to-digital converter to convert the reset voltage of the predetermined connection point into a digital signal, and
the second switch element is not turned on and the first switch element and the third switch element are turned on to cause the analog-to-digital converter to convert a voltage corresponding to the signal charge generated by the photoelectric conversion element into a digital signal.

(2) The solid-state image capture device according to (1), wherein, when the analog-to-digital converter converts the voltage of the predetermined connection point, the voltage being reset by turning-on of the second switch element, into the digital signal, the third switch element is turned on while the second switch element is in the intermediate state between the on state and the off state.

(3) The solid-state image capture device according to (1) or (2), wherein, both when the first switch element is in an on state and when the first switch element is an off state, the analog-to-digital converter converts analog signals output by the pixel into digital signals and performs correlated double sampling to generate digital signals corresponding analog signals of the pixel, and
when the connection degree of the second switch element is varied and the analog signal input from the pixel to the first input terminal changes to have a predetermined threshold or greater,
before the analog-to-digital converter converts the voltage corresponding to the signal charge generated by the photoelectric conversion element into the digital signal after the analog-to-digital converter converts the reset voltage of the predetermined connection point into the digital signal, the connection degree of the second switch element is put into the intermediate state between the on state and the off state, the first input terminal and the second input terminal are set to a same potential, and in the correlated double sampling performed by the analog-to-digital converter, the digital signal generated based on the analog signal output by the pixel when the first switch element is in the on state is disabled and the digital signal generated based on the analog signal output by the pixel when the first switch element is in the off state is used as the digital signal corresponding to the analog signal of the pixel.

The present technology is not limited to the above-described embodiment and modifications, and is intended to encompass a configuration in which the elements disclosed in the above-described embodiment and modifications are mutually interchanged or a combination of the elements is changed, a configuration in which the elements disclosed in related art and the above-described embodiment and modifications are mutually interchanged or a combination of the elements is changed, and so on. The technical scope of the present technology is not limited to the above-described embodiment and covers what is recited in the claims and equivalents thereof.

The present disclosure contains subject matter related to that disclosed in Japanese Priority Patent Application JP 2011-238792 filed in the Japan Patent Office on Oct. 31, 2011, the entire contents of which are hereby incorporated by reference.

What is claimed is:
1. A solid-state image capture device comprising:
a pixel including a photoelectric conversion element configured to convert light into signal charge and first to fourth switch elements;
a reference-signal generator configured to generate a reference signal that changes with time; and
an analog-to-digital converter configured to generate a digital signal corresponding to an analog signal output by the pixel, by using a comparator having a first input terminal connected to the pixel and a second input terminal connected to the reference-signal generator,
wherein the photoelectric conversion element is connected to a predetermined connection point via the first switch element,
the predetermined connection point is connected to a predetermined constant-voltage source via the second switch element and is connected to the first input terminal via the third switch element, and the first input terminal and the second input terminal are connected via the fourth switch element; and wherein, during acquisition of a digital signal corresponding to an amount of light received by the photoelectric conversion element, the second switch element is turned on to reset a voltage of the predetermined connection point, the fourth switch element is turned on while a connection degree of the second switch element is in an intermediate state between an on state and an off state to cause the first input terminal and the second input terminal to reach a same potential, the second switch element is not turned on and the third switch element is turned on to cause the analog-to-digital converter to convert the reset voltage of the predetermined connection point into a digital signal, and the second switch element is not turned on and the first switch element and the third switch element are turned on to cause the analog-to-digital converter to convert a voltage corresponding to the signal charge generated by the photoelectric conversion element into a digital signal.

2. The solid-state image capture device according to claim 1, wherein, when the analog-to-digital converter converts the voltage of the predetermined connection point, the voltage being reset by turning-on of the second switch element, into the digital signal, the third switch element is turned on while the second switch element is in the intermediate state between the on state and the off state.

3. The solid-state image capture device according to claim 1, wherein, both when the first switch element is in an on state and when the first switch element is an off state, the analog-to-digital converter converts analog signals output by the pixel into digital signals and performs correlated double sampling to generate digital signals corresponding analog signals of the pixel, and when the connection degree of the second switch element is varied and the analog signal input from the pixel to the first input terminal changes to have a predetermined threshold or greater, before the analog-to-digital converter converts the voltage corresponding to the signal charge generated by the photoelectric conversion element into the digital signal after the analog-to-digital converter converts the reset voltage of the predetermined connection point into the digital signal, the connection degree of the second switch element is put into the intermediate state between the on state and the off state, the first input terminal and the second input terminal are set to a same potential, and in the correlated double sampling performed by the analog-to-digital converter, the digital signal generated based on the analog signal output by the pixel when the first switch element is in the on state is disabled and the digital signal generated based on the analog signal output by the pixel when the first switch element is in the off state is used as the digital signal corresponding to the analog signal of the pixel.

4. A control method for a solid-state image capture device including a pixel including a photoelectric conversion element configured to convert light into signal charge and first to fourth switch elements, a reference-signal generator configured to generate a reference signal that changes with time, and an analog-to-digital converter configured to generate a digital signal corresponding to an analog signal output by the pixel, by using a comparator having a first input terminal connected to the pixel and a second input terminal connected to the reference-signal generator, wherein the photoelectric conversion element is connected to a predetermined connection point via the first switch element, the predetermined connection point is connected to a predetermined constant-voltage source via the second switch element and is connected to the first input terminal via the third switch element, and the first input terminal and the second input terminal are connected via the fourth switch element, the control method comprising:

resetting a voltage of the predetermined connection point by turning on the second switch element;

causing the first input terminal and the second input terminal to reach a same potential by turning on the fourth switch element while putting a connection degree of the second switch element into an intermediate state between an on state and an off state;

causing the analog-to-digital converter to convert the reset voltage of the predetermined connection point into a digital signal by turning on the third switch element without turning on the third switch element; and causing the analog-to-digital converter to convert a voltage corresponding to the signal charge generated by the photoelectric conversion element into a digital signal, by turning on the first switch element and the third switch element without turning on the second switch element.

5. A non-transitory computer readable medium storing a control program for a solid-state image capture device including a pixel including a photoelectric conversion element configured to convert light into signal charge and first to fourth switch elements, a reference-signal generator configured to generate a reference signal that changes with time, and an analog-to-digital converter configured to generate a digital signal corresponding to an analog signal output by the pixel, by using a comparator having a first input terminal connected to the pixel and a second input terminal connected to the reference-signal generator, wherein the photoelectric conversion element is connected to a predetermined connection point via the first switch element, the predetermined connection point is connected to a predetermined constant-voltage source via the second switch element and is connected to the first input terminal via the third switch element, and the first input terminal and the second input terminal are connected via the fourth switch element, the control program being executable to cause the solid-state image capturer device to implement:

a function of resetting a voltage of the predetermined connection point by turning on the second switch element;

a function of causing the first input terminal and the second input terminal to reach a same potential by turning on the fourth switch element while putting a connection degree of the second switch element into an intermediate state between an on state and an off state;

a function of causing the analog-to-digital converter to convert the reset voltage of the predetermined connection point into a digital signal by turning on the third switch element without turning on the third switch element; and a function of causing the analog-to-digital converter to convert a voltage corresponding to the signal charge generated by the photoelectric conversion element into a digital signal, by turning on the first switch element and the third switch element without turning on the second switch element.

\* \* \* \* \*